US011137052B2

(12) United States Patent
Ore et al.

(10) Patent No.: US 11,137,052 B2
(45) Date of Patent: Oct. 5, 2021

(54) TRANSMISSION ASSEMBLY WITH INTEGRATED CVP

(71) Applicant: Deere & Company, Moline, IL (US)

(72) Inventors: Thomas G. Ore, Cedar Falls, IA (US); David Mueller, Stutensee (DE); Rainer Gugel, Plankstadt (DE); Ronald D. Bremner, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 29 days.

(21) Appl. No.: 16/555,913

(22) Filed: Aug. 29, 2019

(65) Prior Publication Data

US 2021/0062900 A1   Mar. 4, 2021

(51) Int. Cl.
*F16H 3/72* (2006.01)
*F16H 37/04* (2006.01)
(Continued)

(52) U.S. Cl.
CPC .............. *F16H 3/728* (2013.01); *B60K 6/46* (2013.01); *F16H 2037/047* (2013.01); *F16H 2037/048* (2013.01); *F16H 2057/02056* (2013.01)

(58) Field of Classification Search
CPC ...... F16H 3/727–728; F16H 37/04–2037/049; F16H 47/04–2047/045;
(Continued)

(56) References Cited

U.S. PATENT DOCUMENTS 3,214,987 A   11/1965   Schenck et al.
3,626,787 A   12/1971   Singer
(Continued)

FOREIGN PATENT DOCUMENTS

CN   101255907 A   9/2008
CN   102844588 A   12/2012
(Continued)

OTHER PUBLICATIONS

German Search Report for application No. 102019204706.8 dated Dec. 17, 2019.
(Continued)

*Primary Examiner* — Ernesto A Suarez
*Assistant Examiner* — James J Taylor, II
(74) *Attorney, Agent, or Firm* — Klintworth & Rozenblat IP LLP

(57) ABSTRACT

A transmission assembly is provided for a work vehicle powertrain having an engine delivering engine power to an input shaft. The transmission assembly includes a transmission assembly housing having a first housing side through which the input shaft extends and a second housing side; a continuously variable power source (CVP) at least partially contained within the transmission assembly housing; an input arrangement contained within the transmission assembly housing and having at least one input transmission component; a variator contained within the transmission housing with a first variator side oriented toward the first housing side and a second variator side oriented toward the second housing side and configured to receive the engine power and the CVP power through the input arrangement on the second variator side; and a transmission gear arrangement contained within the transmission assembly housing for transmission of output power from the variator to an output shaft.

13 Claims, 7 Drawing Sheets

(51) Int. Cl.
*B60K 6/46* (2007.10)
*F16H 57/02* (2012.01)

(58) Field of Classification Search
CPC .......... F16H 2037/088–0886; F16H 2037/103; B60K 6/46
See application file for complete search history.

(56) References Cited

U.S. PATENT DOCUMENTS

| | | | |
|---|---|---|---|
| 3,651,904 | A | 3/1972 | Snoy et al. |
| 3,714,845 | A | 2/1973 | Mooney, Jr. |
| 3,783,711 | A | 1/1974 | Orshansky, Jr. |
| 4,090,414 | A | 5/1978 | White |
| 4,164,155 | A | 8/1979 | Reed et al. |
| 4,164,156 | A | 8/1979 | Reed |
| 5,156,577 | A * | 10/1992 | Fredriksen .............. F16H 47/04 475/74 |
| 5,353,662 | A | 10/1994 | Vaughters |
| 5,508,574 | A | 4/1996 | Vlock |
| 5,931,757 | A | 8/1999 | Schmidt |
| 6,394,925 | B1 | 5/2002 | Wontner et al. |
| 6,478,705 | B1 | 11/2002 | Holmes et al. |
| 6,684,148 | B2 | 1/2004 | Chess |
| 7,008,342 | B2 | 3/2006 | Dyck et al. |
| 7,252,611 | B2 | 8/2007 | Raghavan et al. |
| 7,294,079 | B2 | 11/2007 | Raghavan et al. |
| 7,308,960 | B2 | 12/2007 | Shimizu et al. |
| 7,311,627 | B2 | 12/2007 | Tarasinski |
| 7,329,201 | B2 | 2/2008 | Raghavan et al. |
| 7,367,911 | B2 | 5/2008 | Raghavan et al. |
| 7,377,876 | B2 | 5/2008 | Yang |
| 7,399,246 | B2 | 7/2008 | Holmes et al. |
| 7,465,251 | B2 | 12/2008 | Zhang |
| 7,473,201 | B2 | 1/2009 | Raghavan |
| 7,479,081 | B2 | 1/2009 | Holmes |
| 7,491,144 | B2 | 2/2009 | Conlon |
| 7,901,314 | B2 | 3/2011 | Salvaire et al. |
| 7,942,776 | B2 | 5/2011 | Conlon |
| 8,234,956 | B2 | 8/2012 | Love et al. |
| 8,257,213 | B2 | 9/2012 | Komada et al. |
| 8,469,127 | B2 | 6/2013 | Tarasinski et al. |
| 8,500,585 | B2 | 8/2013 | Kim et al. |
| 8,573,340 | B2 | 11/2013 | Tarasinski et al. |
| 8,579,751 | B2 | 11/2013 | Phillips |
| 8,596,157 | B2 | 12/2013 | Vu |
| 8,660,724 | B2 | 2/2014 | Tarasinski et al. |
| 8,734,281 | B2 | 5/2014 | Ai et al. |
| 8,747,266 | B2 | 6/2014 | Aitzetmueller |
| 8,784,246 | B2 | 7/2014 | Treichel |
| 8,790,202 | B2 | 7/2014 | Sakai et al. |
| 8,944,194 | B2 | 2/2015 | Glaser et al. |
| 8,986,162 | B2 | 3/2015 | Dix et al. |
| 9,002,560 | B2 | 4/2015 | Hasegawa |
| 9,030,063 | B2 | 5/2015 | Rawlinson et al. |
| 9,097,342 | B2 * | 8/2015 | Dix ...................... F16H 61/472 |
| 9,206,885 | B2 | 12/2015 | Rekow et al. |
| 9,487,073 | B2 | 11/2016 | Love |
| 9,562,592 | B2 | 2/2017 | Rekow et al. |
| 9,944,163 | B2 | 4/2018 | McKinzie |
| 9,981,665 | B2 | 5/2018 | Rekow et al. |
| 10,119,598 | B2 | 11/2018 | Rekow et al. |
| 2003/0186769 | A1 | 10/2003 | Ai et al. |
| 2004/0094381 | A1 | 5/2004 | Versteyhe |
| 2005/0036894 | A1 | 2/2005 | Oguri |
| 2005/0049100 | A1 | 3/2005 | Ai et al. |
| 2005/0211490 | A1 | 9/2005 | Shimizu et al. |
| 2006/0046886 | A1 | 3/2006 | Holmes et al. |
| 2006/0111212 | A9 | 5/2006 | Ai et al. |
| 2006/0142104 | A1 | 6/2006 | Saller |
| 2006/0276291 | A1 | 12/2006 | Fabry et al. |
| 2007/0021256 | A1 | 1/2007 | Klemen et al. |
| 2007/0021257 | A1 | 1/2007 | Klemen et al. |
| 2007/0249455 | A1 | 10/2007 | Hasegawa et al. |
| 2008/0171626 | A1 | 7/2008 | Pollman |
| 2010/0048338 | A1 | 2/2010 | Si |
| 2010/0179009 | A1 | 7/2010 | Wittkopp et al. |
| 2010/0261565 | A1 | 10/2010 | Ai et al. |
| 2011/0130235 | A1 | 6/2011 | Phillips |
| 2012/0157254 | A1 | 6/2012 | Aitzetmueller |
| 2013/0023370 | A1 | 1/2013 | Grad et al. |
| 2013/0123055 | A1 | 5/2013 | Mattsson et al. |
| 2013/0211655 | A1 | 8/2013 | Ogata et al. |
| 2014/0018201 | A1 | 1/2014 | Tolksdorf |
| 2014/0128196 | A1 | 5/2014 | Rintoo |
| 2014/0248986 | A1 * | 9/2014 | Weeramantry ........ F16H 61/462 475/59 |
| 2014/0315685 | A1 | 10/2014 | Hofler |
| 2015/0006007 | A1 | 1/2015 | Kitahata |
| 2015/0072823 | A1 | 3/2015 | Rintoo |
| 2015/0142232 | A1 | 5/2015 | Tabata et al. |
| 2015/0183436 | A1 | 7/2015 | Rekow et al. |
| 2015/0184726 | A1 | 7/2015 | Rekow et al. |
| 2015/0292608 | A1 | 10/2015 | McKinzie |
| 2016/0090091 | A1 | 3/2016 | Gugel et al. |
| 2016/0201295 | A1 | 7/2016 | Kishimoto et al. |
| 2016/0272059 | A1 | 9/2016 | Watanabe et al. |
| 2017/0102059 | A1 | 4/2017 | Rekow et al. |
| 2017/0284508 | A1 | 10/2017 | Devreese |
| 2017/0284517 | A1 | 10/2017 | Rekow et al. |
| 2017/0328453 | A1 | 11/2017 | McKinzie et al. |
| 2018/0043764 | A1 | 2/2018 | McKinzie et al. |
| 2018/0149247 | A1 | 5/2018 | Rekow et al. |
| 2018/0298993 | A1 | 10/2018 | Fliearman et al. |

FOREIGN PATENT DOCUMENTS

| | | | |
|---|---|---|---|
| DE | 1173348 B | 7/1964 | |
| DE | 4010919 A1 | 10/1991 | |
| DE | 19621200 A1 | 11/1997 | |
| DE | 19954636 A1 | 5/2001 | |
| DE | 10128076 A1 | 12/2002 | |
| DE | 10319252 A1 * | 11/2004 | ............. F16H 3/728 |
| DE | 112006002537 T5 | 9/2008 | |
| DE | 202009007972 U1 | 6/2010 | |
| DE | AT11545 U1 | 12/2010 | |
| DE | 102010026460 A1 | 3/2011 | |
| DE | 102012216781 A1 | 3/2011 | |
| DE | 102008032320 A1 | 6/2011 | |
| DE | 102010021846 A1 | 12/2011 | |
| DE | 10201102210 A1 | 7/2012 | |
| DE | 102011102184 A1 | 7/2012 | |
| DE | 10201105868 A1 | 1/2013 | |
| DE | 102011115002 A1 | 4/2013 | |
| DE | 102013204766 A1 | 9/2014 | |
| DE | 102013220167 A1 | 4/2015 | |
| DE | 202015102282 U1 | 6/2015 | |
| DE | 19214225298 A1 | 7/2015 | |
| DE | 102015215461 A1 | 2/2016 | |
| DE | 102015220635 A1 | 5/2016 | |
| DE | 102015200973 A1 | 7/2016 | |
| DE | 102015205932 A1 | 10/2016 | |
| DE | 102016120965 A1 | 5/2017 | |
| DE | 102016204727 A1 | 9/2017 | |
| DE | 102006041160 A1 | 9/2018 | |
| DE | 102018108510 A1 | 10/2018 | |
| DE | 102018209940 A1 | 12/2018 | |
| DE | 102018212712 A1 | 1/2019 | |
| DE | 102019204706 A1 | 11/2019 | |
| DE | 102018213871 A1 | 2/2020 | |
| EP | 805059 A2 | 5/1997 | |
| EP | 1099882 A2 | 5/2001 | |
| EP | 1707416 B1 | 8/2007 | |
| EP | 02466168 | 6/2012 | |
| EP | 02466169 | 6/2012 | |
| EP | 2682531 A1 | 8/2014 | |
| EP | 2832567 A1 | 4/2015 | |
| EP | 2855226 B1 | 9/2018 | |
| JP | 6462174 B1 | 1/2019 | |
| WO | 2007017975 A1 | 2/2007 | |
| WO | WO-2008019799 A2 * | 2/2008 | ............. F16H 61/47 |
| WO | 2011092643 A1 | 8/2011 | |

(56) References Cited

FOREIGN PATENT DOCUMENTS

| | | |
|---|---|---|
| WO | 2012171812 | 12/2012 |
| WO | 2017107848 A1 | 6/2017 |

OTHER PUBLICATIONS

Deere & Company, Utility U.S. Appl. No. 15/879,796, filed Jan. 25, 2018.
Deere & Company, Utility U.S. Appl. No. 15/971,867, filed May 4, 2018.
Deere & Company, Utility U.S. Appl. No. 15/977,242, filed May 11, 2018.
Deere & Company, Utility U.S. Appl. No. 16/371,598, filed Apr. 1, 2019.
German Search Report for application No. 10215206174 dated Jul. 16, 2015.
German Search Report for application No. 1020182036705 dated Dec. 20, 2018.
German Search Report for application No. 102018210616 dated Feb. 1, 2019.
German Search Report for application No. 1020182099391 dated Feb. 27, 2019.
German Search Report for application No. 102018212712 dated Apr. 12, 2019.
CNIPA Office Action for Application No. 201510165982.4 dated Aug. 9, 2018, Serial Notice No. 2018080601675890.
USPTO, Office Action in U.S. Appl. No. 15/664,289 dated Jul. 26, 2018.
USPTO, Office Action in U.S. Appl. No. 14/249,258 dated Apr. 21, 2017.
USPTO, Office Action in U.S. Appl. No. 15/664,289 dated Dec. 13, 2018.
USPTO, Office Action in U.S. Appl. No. 14/249,258 dated Oct. 17, 2016.
USPTO, Office Action in U.S. Appl. No. 14/249,258 dated Aug. 22, 2017.
USPTO, Office Action in U.S. Appl. No. 15/485,911 dated Feb. 8, 2019.
USPTO, Office Action in U.S. Appl. No. 15/793,522 dated Apr. 18, 2019.
USPTO, Office Action in U.S. Appl. No. 15/879,796 dated Aug. 23, 2019.
Schmetz, Roland, Electromechanische Traktorgetriebe Getriebe mit Zukunft, Electromechanical Tractor Units—Gearboxes with a Future, Landtechnik, Agricultural Engineering, vol. 54; Issue 2; pp. 72-73, Feb. 1999.
John M. Miller, Hybrid Electric Vehicle Propulsion System Architectures of the e-CVT Type, IEEE Transactions on Power Electronics, vol. 21, No. 3, May 2006.
Jian Dong, Zuomin Dong, Curran Crawford, Review of Continuously Variable Transmission Powertrain System for Hybrid Electric Vehicles, Proceedings of the ASME 2011 International Mechanical Engineering Congress & Exposition, IMECE2011-63321, Nov. 11-17, 2011.
German Search Report for application No. 1020182099405 dated Feb. 28, 2019.
USPTO, Office Action in U.S. Appl. No. 14/536,097 dated Sep. 25, 2017.
Luscious Garage Hybrid Specialists, Gen 1 Prius Transmission Repair, P3009, P3120, P3125, https://lusciousgarage.com/blog/gen_1_prius_transmission_repair_p3009_p3120_p3125/ dated Oct. 28, 2008.
German Search Report for application No. 102019205211 dated Sep. 5, 2019.
German Search Report for German application No. 102020202651.3 dated Sep. 1, 2020.
USPTO Final Office Action issued in Utility U.S. Appl. No. 15/971,867 dated Jun. 24, 2020.
USPTO, Non-Final Office Action issued in pending Utility U.S. Appl. No. 15/628,979 dated Nov. 5, 2019.
USPTO, Office Action in U.S. Appl. No. 16/371,598 dated Jul. 21, 2020.
USPTO, Non-Final Office Action issued in pending Utility U.S. Appl. No. 15/971,867 dated Dec. 12, 2019.
German Search Report issued in application No. 102020213675.0 dated Mar. 17, 2021. (10 pages).
German Search Report issued in counterpart application No. 102020209003.3 dated Apr. 15, 2021 (10 pages).
German Search Report issued in counterpart application No. 102017220666.7 dated May 28, 2021. (10 pages).
Extended European Search Report issued in counterpart application No. 20205965.5 dated Jul. 28, 2021. (10 pages).

\* cited by examiner

TRANSMISSION ASSEMBLY WITH INTEGRATED CVP

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to powertrains, including multi-mode powertrains for the operation of work vehicles for agricultural, forestry, construction, and other applications.

BACKGROUND OF THE DISCLOSURE

It may be useful, in a variety of settings, to utilize both a traditional engine (e.g., an internal combustion engine) and at least one continuously variable power source ("CVP") (e.g., an electric motor/generator or hydraulic motor/pump, and so on) to provide useful power to an output member. For example, a portion of engine power may be diverted to drive a first CVP, which may in turn drive a second CVP. Power from the engine and/or the second CVP may be delivered to the output member (e.g., a vehicle axle or other output shaft). The engine, the CVP(s), and the output member may be operatively connected via an infinitely variable transmission ("IVT") or continuously variable transmission ("CVT").

Many CVTs have disadvantages. For example, some CVTs may not provide sufficient power delivery for some operating conditions. Other CVTs may decrease operating efficiency, causing the fuel consumption to be high. Also, some CVTs may be overly complicated, may contain an excessive amount of parts, and/or may be difficult to assemble and repair. As such, manufacture and maintenance of these CVTs may be inefficient. Furthermore, these CVTs may be bulky and packaging the CVT on a work vehicle can be difficult.

SUMMARY OF THE DISCLOSURE

A transmission assembly is provided for a work vehicle powertrain having an engine delivering engine power to an input shaft. The transmission assembly includes a transmission assembly housing having a first housing side through which the input shaft extends and a second housing side opposite the first housing side; a continuously variable power source (CVP) at least partially contained within the transmission assembly housing; an input arrangement contained within the transmission assembly housing and having at least one input transmission component selectively coupling the engine power from the input shaft and CVP power from the CVP; a variator contained within the transmission housing with a first variator side oriented toward the first housing side of the transmission assembly housing and a second variator side oriented toward the second housing side of the transmission assembly housing and configured to receive the engine power through the input arrangement on the second variator side and to receive the CVP power through the input arrangement on the second variator side; and a transmission gear arrangement contained within the transmission assembly housing and configured to provide a selective gear reduction for transmission of output power from the variator to an output shaft.

Also, a method of manufacturing a powertrain for a work vehicle is disclosed. The method includes providing an engine, a continuously variable power source (CVP), and an output shaft; and providing a transmission assembly configured to operably connect the engine and the CVP to the output shaft. The transmission assembly is configured to provide selection between a plurality of transmission modes in which the transmission assembly transmits power from at least one of the engine and the CVP to the output shaft. The transmission assembly includes an input arrangement defining an input axis and having at least one input transmission component that is supported for rotation about the input axis. The engine is connected to the input arrangement and configured to input engine power thereto for rotating the at least one input transmission component, and the CVP is connected to the input arrangement and configured to input CVP power thereto for rotating the at least one input transmission component. The transmission assembly includes a variator defining a variator axis. The variator includes at least one planetary gear set group at least partially supported for selective rotation about the variator axis and arranged to have a first gear set side and a second gear set side and a variator shaft supported for rotation about the variator axis and extending through the at least one planetary gear set. The variator shaft has a first variator shaft side proximate to or extending beyond the first gear set side of the at least one planetary gear set group and a second variator shaft side proximate to or extending beyond the second gear set side of the at least one planetary gear set group. The first gear set side and the first variator shaft end define a first variator side, and the second gear set side and the second variator shaft end defining a second variator side. The transmission assembly includes a countershaft arrangement defining a countershaft axis and having at least one countershaft component that is supported for rotation about the countershaft axis. The countershaft arrangement is configured to receive the combined power from the variator for rotating the at least one countershaft component. The transmission assembly further includes an output arrangement defining an output axis and with at least one output component connected to the output shaft. The output arrangement is configured to receive the combined power from the countershaft arrangement to drive the output shaft in rotation about the output axis. The method further includes arranging the transmission assembly and the CVP such that the transmission assembly is configured to operate in at least one of the plurality of transmission modes in which the variator receives the engine power and the CVP power on a common side of the first and second variator sides via the input arrangement and to output combined power.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
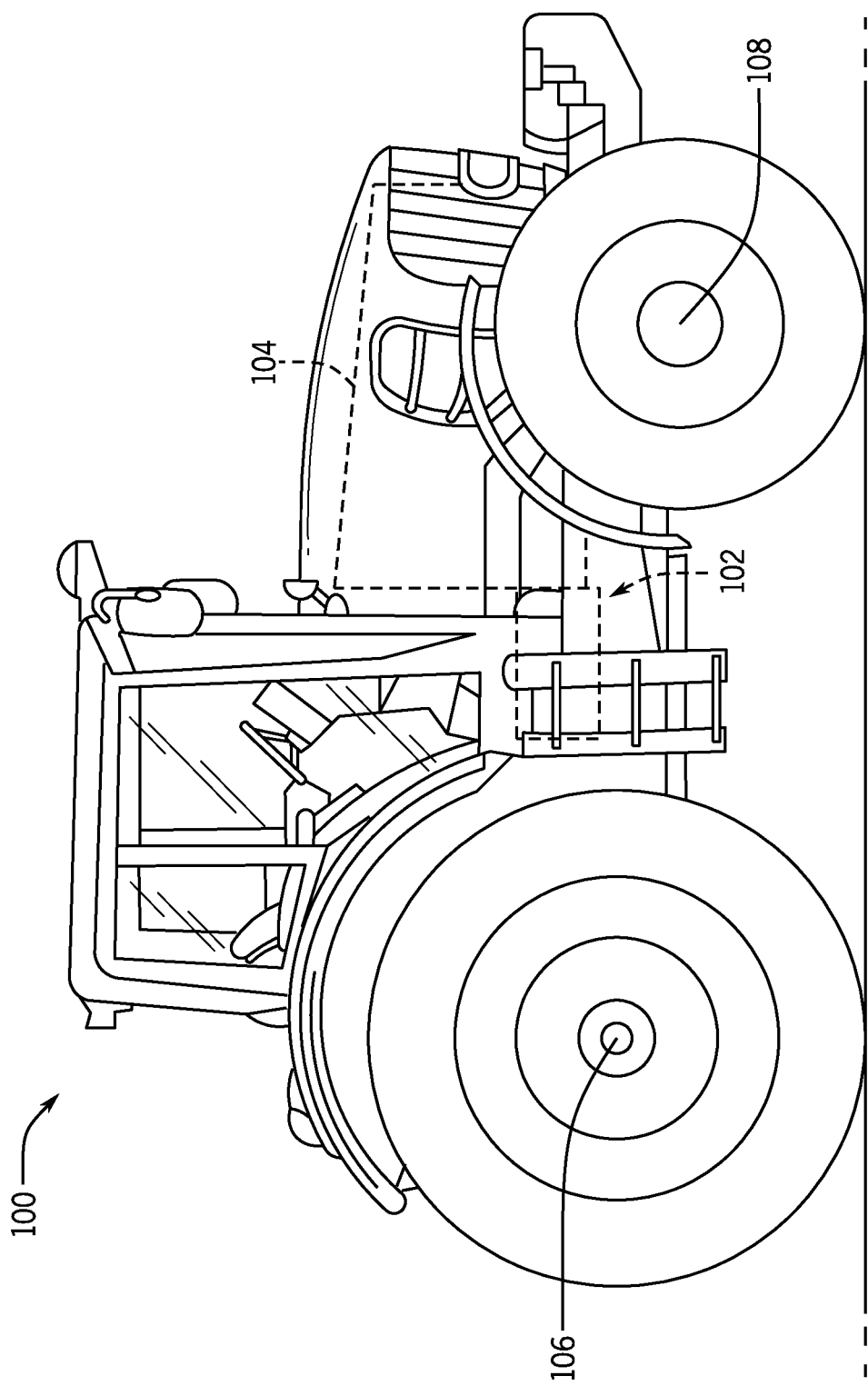
FIG. 1 is a side view of a work vehicle according to example embodiments of the present disclosure.

The following describes one or more example embodiments of the disclosed powertrain (or vehicle), as shown in the accompanying figures of the drawings described briefly above. Various modifications to the example embodiments may be contemplated by one of skill in the art.

For convenience of notation, "component" may be used herein, particularly in the context of a planetary gear set, to indicate an element for transmission of power, such as a sun gear, a ring gear, or a planet gear carrier. Further, references to a "continuously" variable transmission, powertrain, or power source will be understood to also encompass, in various embodiments, configurations including an "infinitely" variable transmission, powertrain, or power source.

In the discussion below, various example configurations of shafts, gears, and other power transmission elements are described. It will be understood that various alternative configurations may be possible within the spirit of this disclosure. For example, various configurations may utilize multiple shafts in place of a single shaft (or a single shaft in place of multiple shafts), may interpose one or more idler gears between various shafts or gears for the transmission of rotational power, and so on.

As used herein, "direct" or "directly" may be used to indicate power transmission between two system elements without an intervening conversion of the power to another form. For example, power may be considered as "directly" transmitted by an engine to an output component if the power is transferred via a number of shafts, clutches, and gears (e.g., various spur, bevel, summing or other gears) without being converted to a different form by a CVP (e.g., without being converted to electrical or hydraulic power by an electrical generator or a hydraulic pump). In certain configurations, fluidic transfer of rotational power by a torque converter may also be considered "direct."

In contrast, power may not be considered as "directly" transmitted between two system elements if a substantive portion of the power is converted to another form during transmission. For example, power may not be considered as "directly" transmitted between an engine and an output component if a portion of the engine's power is converted to a different form by a CVP, even if that portion is later reconverted to rotational power (e.g., by another CVP) and then recombined with the unconverted engine power (e.g., by a summing planetary gear or other summing assembly).

Also as used herein, "between" may be used with reference to a particular sequence or order of power transmission elements, rather than with regard to physical orientation or placement of the elements. For example, a clutch device may be considered as being "between" an engine and an output component if power is routed to the output component via the clutch device, whether or not the engine and the output component are on physically opposite sides of the clutch device.

The continuously variable transmission (CVT) (or "transmission assembly") of the present disclosure may provide a plurality of different modes. For example, a "split-path" power transmission mode may be provided in which power from both the engine and a CVP is combined for delivery of useful power to the output member. This is referenced as "split-path" power transmission because of the split between a direct mechanical path from the engine and an infinitely/continuously variable path through one or more CVPs. In additional embodiments, useful power may be provided by a CVP but not by the engine (except to the extent the engine drives the CVP). This may be referred to as "CVP-only" power transmission or series mode. Finally, in some embodiments, useful power may be provided by the engine (e.g., via various mechanical transmission elements, such as shafts and gears), but not by a CVP. This may be referred to as "mechanical-path" power delivery.

In certain embodiments, an engine may provide power via various mechanical (or other) power transmission elements (e.g., various shafts and gears, and so on) to both a first input component of a variator (e.g., a planet carrier of a summing planetary gear set group) and an input interface (e.g., a splined connection for a rotating shaft) of a first CVP. The first CVP (e.g., an electrical or hydraulic machine) may convert the power to a different form (e.g., electrical or hydraulic power) for transmission to a second CVP (e.g., another electrical or hydraulic machine), in order to enable the second CVP to provide rotational power to a second input of the variator (e.g., a sun gear of the summing planetary gear set group).

In the use of continuously (or infinitely) variable powertrains, the relative efficiency of power transmission in various modes may be of some concern. It will be understood, for example, that energy losses may inhere in each step of using a first CVP to convert rotational power from the engine into electrical or hydraulic power, transmitting the converted power to a second CVP, and then converting the transmitted power back to rotational power. In this light, mechanical transmission of power directly from an engine (i.e., in mechanical-path transmission mode) may be viewed a highly efficient mode of power transmission, whereas transmission of power through a CVP (e.g., in a split-path transmission mode or a CVP-only transmission mode) may be less efficient. Accordingly, in certain circumstances it may be desirable to utilize mechanical-path transmission mode rather than a split-path mode or CVP-only mode. However, in other circumstances, the flexibility and other advantages provided by use of CVPs may outweigh the inherent energy losses of a split-path or CVP-only mode.

Among other advantages, the powertrains disclosed herein may usefully facilitate transition between split-path, mechanical-path, and CVP-only modes for a vehicle or other powered platform. For example, through appropriate arrangement and control of various gear sets, shafts and clutches, the disclosed powertrain may allow a vehicle to be easily transitioned between any of the three modes, depending on the needs of a particular operation. The transmission assembly of the present disclosure may also provide a plurality of modes that provide different output speed ranges. For example, in some embodiments, a first split-path mode and a second split-path mode may be provided. The first split-path mode may provide lower output speed ranges than the second split-path mode.

A set of transmission elements may be provided for selectively changing between a plurality of modes. The set may include clutches, brakes, and/or other components that may be selectively engaged and disengaged for changing the mode of the transmission. The set may also enable selective switching between the mechanical-path transmission mode, the split-path mode, and the CVP-only mode. In some embodiments, a transmission assembly of the present disclosure may include at least one CVP-only mode and at least one split-path field mode. In some embodiments, the transmission assembly may additionally provide at least one mechanical-only mode.

In some embodiments, the transmission assembly may be constructed to maintain torque at the output shaft and a rotational speed of zero. This may be referred to as "powered-zero". This mode may also allow the output shaft to rotate at low rotational speeds. This may be referred to as a "creeper mode". In some embodiments, the powered-zero and creeper modes may be CVP-only modes. The transmission assembly may also provide one or more "field modes" for moving the work vehicle at higher speeds. In some embodiments, there may be a plurality of field modes, each providing different ground speed ranges for the work vehicle. Furthermore, in some embodiments, the transmission assembly may provide at least one forward mode (for moving the work vehicle in a forward direction) and at least one reverse mode (for moving the work vehicle is a reverse direction).

The transmission assembly of the present disclosure may provide various advantages. For example, in one arrangement or orientation, the transmission assembly may have a configuration that enables the integration of the CVP within the transmission assembly housing. For example, the transmission assembly is configured such that the machines of the CVP may be parallel to and axially overlap the other shafts and components within the transmission assembly housing. In one example, the CVP may provide a power input on a common side of a variator of the transmission assembly as that of the engine. This configuration provides a relatively smaller footprint for the transmission assembly and CVP with a shorter length while enabling multiple operational modes, thereby allowing use of the transmission assembly across a number of platforms.

As will become apparent from the discussion herein, the disclosed powertrain may be used advantageously in a variety of settings and with a variety of machinery. For example, referring now to FIG. 1, an example of the disclosed powertrains may be included in a work vehicle 100. In FIG. 1, the work vehicle 100 is depicted as a tractor with a powertrain 102 (shown schematically). It will be understood, however, that other configurations may be possible, including configurations with the vehicle 100 as a different kind of tractor, a harvester, a log skidder, a grader, or one of various other work vehicle types. It will further be understood that the disclosed powertrains may also be used in non-work vehicles and non-vehicle applications (e.g., fixed-location power installations).

Generally, the powertrain 102 may be configured to generate power and to transmit the power from an engine 104 and/or other power sources to an output member (e.g., an output shaft). In some embodiments, the powertrain 102 may transmit the power to a rear axle 106 and/or to a front axle 108 of the work vehicle 100. However, the powertrain 102 may be configured for delivering power to a power take-off shaft for powering an implement that is supported on the vehicle 100 or that is supported on a separate vehicle. It will be appreciated that the powertrain 102 may be configured for delivering power to other power sinks without departing from the scope of the present disclosure.

Figure 2:
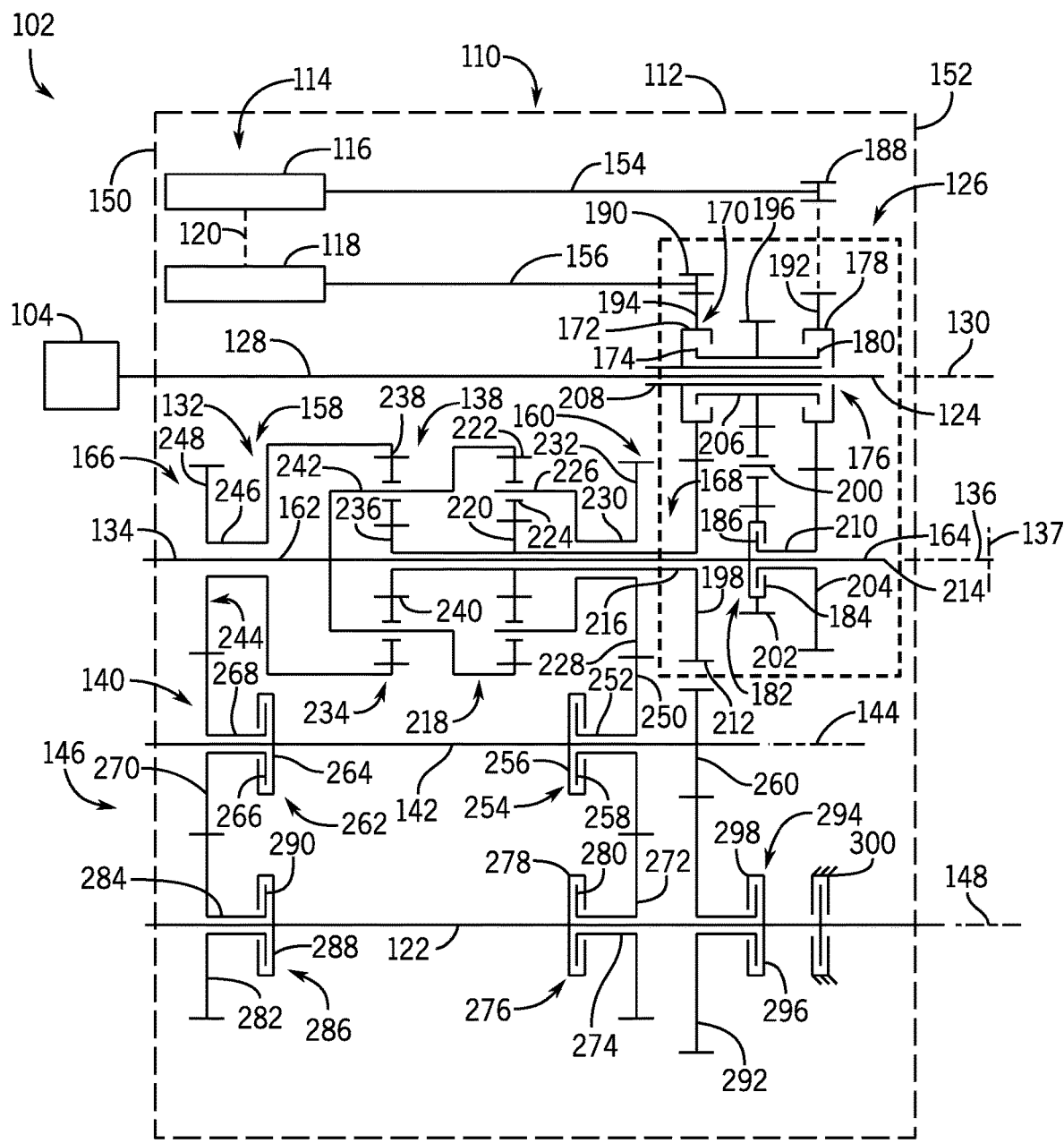
FIG. 2 is a schematic view of a multi-mode continuously variable transmission assembly according to an example embodiment of the present disclosure.

Referring now to FIG. 2, an example configuration of the powertrain 102 is depicted schematically. The powertrain 102 may include the engine 104, which may be an internal combustion engine of various known configurations. The powertrain 102 also includes a transmission assembly 110 with a housing 112 that at least partially houses a continuously variable power source (CVP) 114. The CVP 114 may include at least one continuously variable machine (CVM), such as an electrical machine or a hydraulic machine. In the embodiment shown, the CVP 114 includes a first CVM 116 and a second CVM 118. As shown in FIG. 2, the first CVM 116 may be operably connected to the second CVM 118 via a conduit 120, such as one or more electrical wires.

Generally, the transmission assembly 110 includes a plurality of components, such as shafts, gears, gear sets, clutches, brakes, and/or other components, that interconnect to enable the transfer power amongst the engine 104, the first CVM 116, and/or the second CVM 118 to appropriately power an output shaft 122 and/or one or more other output members. For example, the output shaft 122 may form or may be directly connected to one or more power sinks (e.g., one or both axles 106, 108) of the vehicle 100. An additional power output of the transmission assembly 110 may be one or power take-off ("PTO") shaft elements 124. In certain embodiments, a torque converter or other device may be included between the engine 104 and the output shaft 122 (or another shaft (not shown)), although such a device is not necessary for the operation of the powertrain 102, as contemplated by this disclosure. Further, in certain embodiments, multiple shafts (not shown), including various shafts interconnected by various gears or other power transmission components, or equivalent power transmission components (e.g., chains, belts, and so on) may be included.

The transmission assembly 110 may be considered a continuously variable transmission or an infinitely variable transmission. Also, the transmission assembly 110 may be configured to provide selection between one of the plurality of transmission modes in which the transmission assembly 110 transmits power from the engine 104 and/or the CVP 114 to the output shaft 122.

In addition to providing rotational power to the output shaft 122, the engine 104 may also provide rotational power to the first CVM 116 via the transmission assembly 110. Continuing, the first CVM 116 may convert the received power to an alternate form (e.g., electrical or hydraulic power) for transmission over the conduit 120. This converted and transmitted power may be received by the second CVM 118 and then re-converted by the second CVM 118 to provide a rotational power output. Various known control devices (not shown) may be provided to regulate such conversion, transmission, re-conversion and so on.

In some embodiments, the first CVM 116 and the second CVM 118 are both electrical machines. Also, in some embodiments, the first and/or second CVMs 116, 118 may be configured to operate as a motor (to output mechanical power from electrical input power) and as a generator (to output electrical power from mechanical input power).

Generally, in some embodiments, the transmission assembly 110 may include an input arrangement 126 with an input shaft 128 defining an input axis 130. The input arrangement 126 may be substantially centered with respect to the input axis 130. The input axis 130 may represent an axis of rotation for at least a portion of the input arrangement 126. Accordingly, the input arrangement 126 may include at least one input component, discussed below, that is supported for rotation about the input axis 130 and/or other portions of the transmission assembly 110. As will be discussed, the engine 104 and the CVP 114 may be operatively connected to the input arrangement 126.

The transmission assembly 110 may also include a variator 132 with at least one variator shaft 134 defining an associated variator axis 136. The variator 132 may be substantially centered with respect to the variator axis 136. The variator 132 may include at least one variator component, discussed below, that is supported for rotation about the variator axis 136. The variator 132 is operably connected to the engine 104 and the CVP 114 via the input arrangement 126. Generally, the variator 132 and/or input arrangement 126 may include a variety of devices capable of summing the mechanical inputs from the engine 104 and the CVP 114 for a combined mechanical output to the output shaft 122 for split-path power transmission. In certain embodiments, as depicted in FIG. 2, the variator 132 may be configured with a summing planetary gear set group 138 (e.g., a double planetary gear set group), as described in greater detail below. It will be understood, however, that other configurations may be possible.

The transmission assembly 110 may further include countershaft arrangement 140 with a countershaft 142 defining a countershaft axis 144. The countershaft arrangement 140 may be substantially centered with respect to the countershaft axis 144. The countershaft axis 144 may represent an axis of rotation for the countershaft arrangement 140. Accordingly, the countershaft arrangement 140 may include at least one countershaft component, discussed below, that is supported for rotation about the countershaft axis 144. The countershaft arrangement 140 may be configured for changing rotational direction of the power delivered from the variator 132.

Furthermore, the transmission assembly 110 may include an output arrangement 146 at least partially formed by the output shaft 122 defining an output axis 148. The output arrangement 146 may be substantially centered with respect to the output axis 148. The output axis 148 may represent an axis of rotation for the output arrangement 146. Accordingly, the output arrangement 146 may include at least one output component, discussed below, that is supported for rotation about the output axis 148. As such, the output arrangement 146 may deliver power from the countershaft arrangement 140 to the output shaft 122. Generally, the clutches and gears associated with the countershaft arrangement 140 and the output arrangement 146 (and in some embodiments, portions of the variator 132) may be collectively considered a transmission gear arrangement that transfers power, as appropriate or desired, to the output shaft 122.

In some embodiments, the variator 132 may be disposed between and operatively connected to the input arrangement 126 and the countershaft arrangement 140. Also, the countershaft arrangement 140 may be disposed between and operatively connected to the variator 132 and the output arrangement 146. As such, the transmission assembly 110 may be configured for power flow along a path from the input arrangement 126, through the variator 132 and the countershaft arrangement 140, and to the output arrangement 146.

In some embodiments, the input axis 130, the variator axis 136, the countershaft axis 144, and the output axis 148 may be substantially parallel and spaced apart at a distance from each other, although arrangements may vary. Accordingly, as will be discussed, the transmission assembly 110 may be configured for different work vehicles with different packaging requirements.

The transmission assembly 110 may be configured as a multi-mode transmission and may provide selective shifting between the different modes. For example, the transmission assembly 110 may provide one or more split-path power transmission modes. In each of these modes, power from the engine 104 and the CVP 114 may be combined or summed (e.g., by the variator 132), and the resulting combined or summed power may be delivered to the output shaft 122. In one split-path mode, the output shaft 122 may be rotated within a first speed range, and in another split-path mode, the output shaft 122 may be rotated within a second speed range. The second speed range may be higher than the first speed range in some embodiments. There may be additional split-path modes providing other speed ranges for the output shaft 122 as well.

Additionally, the transmission assembly 110 may provide one or more CVP-only modes. For example, in some embodiments, the transmission assembly 110 may, in a sense, disconnect the engine 104 from the output shaft 122 and instead deliver CVP power from the CVP 114 to the output shaft 122. In some embodiments, the speed range for the output shaft 122 during a CVP-only mode may be relatively low. For example, the transmission assembly 110 may provide a CVP-only mode at which torque is maintained at the output shaft 122 while the output shaft 122 remains stationary (i.e., angular velocity of zero). This may be referred to as "powered zero". The output shaft 122 may be driven at relatively low speeds (i.e., "creeper speeds") as well in this CVP-only mode.

As shown in FIG. 2, the transmission assembly 110 may include a set of selective transmission components (e.g., a control set) for selecting between the different transmission modes. The selective transmission components may include wet clutches, dry clutches, dog collar clutches, brakes, or other similar components that may selectively move between an engaged position and a disengaged position. More specifically, a representative selective transmission component may include a first member and a second member that may engage each other (i.e., fixedly attach together for rotation as a unit) and, alternatively, disengage from each other (i.e., detach to allow relative rotation between the two). Although not shown, the control set may be connected to a control system for controlling actuation of the individual transmission component members.

Accordingly, as will be discussed further, the transmission assembly 110 may provide effective power transmission across a number of modes such that the powertrain 102 is highly efficient. As a result, the transmission assembly 110 may enhance fuel efficiency of the work vehicle 100. Also, the transmission assembly 110 may be relatively compact and may have a relatively simple design and assembly. Additionally, the transmission assembly 110 may be highly configurable such that the transmission assembly 110 may be tailored for a particular work vehicle 100 (e.g., to meet packaging requirements).

As introduced above, portions of the transmission assembly 110 are housed in the transmission assembly housing 112 that is schematically depicted in FIG. 2. Generally, the transmission assembly 110 and/or transmission assembly housing 112 may be considered to have first and second sides (or left and right sides in the view of FIG. 2) that may represent the physical orientation of the transmission assembly 110 as implemented. For example, the transmission assembly housing 112 may be considered to have a first housing side 150 and a second housing side 152, opposite the first housing side 150, that generally reference the collective axial orientation of the transmission assembly 110. Similarly, the components of the transmission assembly 110 may be considered to have corresponding first and second sides relatively proximate to the respective side 150, 152 of the transmission assembly housing 112, as described below.

For example, the input shaft 128 from the engine 104 extends into the first side 150 of the transmission assembly housing 112 and to (or proximate to) the second side 152 of the transmission assembly housing 112. Additionally, the first and second CVMs 116, 118 are positioned at or proximate to the first side 150 of the transmission assembly housing 112, and each of the first and second CVMs 116, 118 has a CVM shaft 154, 156 that extends towards the second side 152 of the transmission assembly housing 112. Similarly, the planetary gear set group 138 of the variator 132 generally has a first gear set side 158 oriented toward the first side 150 of the transmission assembly housing 112 and a second gear set side 160 oriented toward the second side 152 of the transmission assembly housing 112; and the variator shaft 134 extending through the planetary gear set group 138 has a first variator shaft side 160 oriented toward the first side 150 of the transmission assembly housing 112 and a second variator shaft side 162 oriented toward the second side 152 of the transmission assembly housing 112. As such, collectively, the first gear set side 158 and first variator shaft side 162 may be considered a first variator side (or first axial variator side) 166, and the second gear set side 160 and second variator shaft side 164 may be considered a second variator side (or second axial variator side) 168.

The transmission assembly 110 will be now discussed in detail according to example embodiments. As introduced above, the input arrangement 126 includes a number of clutches that facilitate the transfer of power between the engine 104, the CVP 114, and the variator 132. In one example, the input arrangement 126 includes first, second, and third clutches 170, 176, 182. In the discussion below, the first clutch 170 may be referred to as a creeper clutch; the second clutch 176 may be referred to as a reverse clutch; and the forward clutch 182 may be referred to as a forward clutch. These clutches 170, 176, 182 are selectively controlled by a controller (not shown) to appropriately distribute power from and between the engine 104, CVP 114, and/or variator 132 to modify the direction and/or speed of power flow to the output shaft 122. The input arrangement 126 further includes a number of gears 188, 190, 192, 194, 196, 198, 200, 202, 204 and hollow shafts 206, 208, 210 that transfer power, as will now be described.

As shown, a first gear 188 is fixed for rotation on the first CVM shaft 154. The first gear 188 is positioned to transfer power (e.g., enmeshed or otherwise) with a third gear 192 mounted on the reverse clutch 176. The reverse clutch 176 generally circumscribes and is supported for various rotations about the input shaft 128. In particular, the reverse clutch 176 may include at least one first member 178 (e.g., first clutch plate(s)) on which is mounted the third gear 192 that is fixed for rotation with the first member 178 of the reverse clutch 176. The reverse clutch 176 may also include at least one second member 180 (e.g., second clutch plate(s)) that is fixed for rotation on an end of a first hollow shaft 206. The reverse clutch 176, first gear 188, and third gear 192 are generally proximate to the second side 152 of the transmission assembly housing 112, particularly relative to the variator 132.

In this arrangement, the first CVM shaft 154 is connected to the first CVM 116 as an input shaft such that, when the reverse clutch 176 is engaged (e.g., the first and second members 178, 180 of the reverse clutch 176 are forced to engage to rotate as a unit), power is transferred from the first hollow shaft 206, through the reverse clutch 176, and through the third and first gears 192, 188 to drive the first CVM shaft 154, and thus the first CVM 116. The reverse clutch 176 may be disengaged (e.g., the first and second members 178, 180 are disengaged or released) to cut off this power flow.

A second gear 190 is fixed for rotation on the second CVM shaft 156 and is positioned to transfer power (e.g., enmeshed) with the fourth gear 194 mounted on the creeper clutch 170. The creeper clutch 170 generally circumscribes and is supported for various rotations about the input shaft 128. In particular, the creeper clutch 170 may include at least one first member 172 (e.g., first clutch plate(s)) on which is mounted a fourth gear 194 that is fixed for rotation with the first member 172 of the creeper clutch 170. The creeper clutch 170 may also include at least one second member 174 (e.g., second clutch plate(s)) that is fixed for rotation on an end of the first hollow shaft 206. The creeper clutch 170, second gear 190, and fourth gear 194 are generally proximate to the second side 152 of the transmission assembly housing 112, particularly relative to the variator 132.

In this example, the second CVM shaft 156 is connected to the second CVM 118 as an output shaft such that, when the creeper clutch 170 is in an engaged position (e.g., the first and second members 172, 174 of the creeper clutch 170 are forced to engage to rotate as a unit), power is transferred from the second CVM 118, through the second and fourth gears 190, 194, and through the creeper clutch 170 to drive the first hollow shaft 206 and associated components, described in greater detail below. The creeper clutch 170 may have a disengaged position (e.g., the first and second members 172, 174 are disengaged or released) to enable relative rotation and disconnect this power flow.

The first member 172 of the creeper clutch 170 is mounted on and fixed to a second hollow shaft 208. The second hollow shaft 208 may receive a portion of the first hollow shaft 206 and be supported for rotation about the input axis 130. Further, the first hollow shaft 206 may surround the input shaft 128 and may be supported for rotation about the input axis 130. The second hollow shaft 208 is surrounded by the first hollow shaft 206 that is also supported for relative rotation. As introduced above, the first end of the first hollow shaft 206 supports and rotates with the second member 174 of the creeper clutch 170 and the second end of the first hollow shaft 206 supports and rotates with the second element of the reverse clutch 176.

In addition to the second gear 190, the fourth gear 194 mounted on the first member 172 of the creeper clutch 170 is enmeshed with a sixth gear 198. The sixth gear 198 is fixed on the end of a first input member 212 of the planetary gear set group 138. As a result of this arrangement, the second CVM 118 is configured to provide rotational input to the planetary gear set group 138 via the second CVM shaft 156, the second gear 190, the fourth gear 194, and the first input member 212. As shown, in this arrangement, the power flow is provided to the planetary gear set group 138 on the second gear set side 160, and generally, to the variator 132 on the second variator side 168.

A fifth gear 196 may be fixed to the first hollow shaft 206. The fifth gear 196 may be interposed on the first hollow shaft 206 between the creeper clutch 170 and the reverse clutch 176. The fifth gear 196 may be enmeshed with a seventh gear 200, which in this example is an idler gear. The idler gear 200 may be supported for rotation about an idler axis, which in this example, may be parallel to and spaced apart from the input axis 130.

The idler gear 200 may be enmeshed with an eighth gear 202. The eighth gear 202 is supported on the forward clutch 182 for rotation about the variator axis 136. As above, the forward clutch 182 may include at least one first member 184 and at least one second member 186. The first member 184 may be fixed to the eighth gear 202 for rotation about the variator axis 136. The second member 186 may be fixed to an end of a third hollow shaft 210.

Generally, the third hollow shaft 210 is configured to receive a portion of the variator shaft 134, particularly a portion of the second variator shaft side 164. Additionally, a ninth gear 204 may be fixed on the third hollow shaft 210 on an end opposite the forward clutch 182. The ninth gear 204 may be enmeshed with the third gear 192 mounted on the first member 178 of the reverse clutch 176. The first member 184 of the forward clutch 182 is also fixed to the variator shaft 134.

As such, the forward clutch 182 may have an engaged position between the first member 184 and the second member 186 to allow power transmission between the third hollow shaft 210 and the eighth gear 202. The forward clutch 182 further has a disengaged position in which the first and second members 184, 186 are disengaged to cut off the power transmission path between the first member 184 of the forward clutch 182 and the third hollow shaft 210, while maintaining the power transmission path between the first member 184 of the forward clutch 182 and the variator shaft 134.

As described in greater detail below, the second end 164 of the variator shaft 134 (and the gears fixed thereto) may be considered a second input member 214 of the planetary gear set group 138, and thus, the variator 132. Like the reverse clutch 176 and the creeper clutch 170, the forward clutch 182, the third hollow shaft 210, and the ninth gear 204 are generally proximate to the second side 152 of the transmission assembly housing 112, particularly relative to the variator 132. As such, input that flows through the forward clutch 182 is transferred to the second side 164 of the variator shaft 134, and more generally, into the second side 168 of the variator 132.

As introduced above, the variator 132 may include the planetary gear set group 138, which in this example is a double planetary gear set group. However, it will be appreciated that the variator 132 may vary from the illustrated embodiment without departing from the scope of the present disclosure. Furthermore, it will be appreciated that the variator 132 may include a plurality of variator members, some of which may serve as power inputs and some of which may serve as power outputs, depending on the mode in which the transmission assembly 110 is operating.

In the illustrated embodiment, the planetary gear set group 138 circumscribes and is at least partially mounted on a fourth hollow shaft 216. The fourth hollow shaft 216 receives the variator shaft 134 to selectively rotate about the variator axis 136. One end of the fourth hollow shaft 216 forms by the first input member 212 of the planetary gear set group 138 to receive power transfer via the sixth gear 198 mounted to the fourth hollow shaft 216.

In this example, the planetary gear set group 138 may include a first planetary gear set 218 (a low planetary gear set) with a first sun gear 220, a first ring gear 222, and a plurality of first planet gears 224 with a respective first carrier 226. The first sun gear 220 may be fixed to the fourth hollow shaft 216 for rotation about the variator axis 136. The first planet gears 224 may be enmeshed with and disposed between the first sun gear 220 and the first ring gear 222. The first planet gears 224 and the first carrier 226 may be configured to rotate together about the variator axis 136. Likewise, the first ring gear 222 may be centered on and supported for rotation about the variator axis 136.

In addition, the variator 132 may include a first output member 228. The first output member 228 may be mounted on a relatively short, fifth hollow shaft 230 that receives the fourth hollow shaft 216 and the variator shaft 134. The fifth hollow shaft 230, and thus the first output member 228, may be fixed to the first carrier 226 for rotation therewith about the variator axis 136. A tenth (or first variator output) gear 232 may be fixed on the first output member 228. In some embodiments, the first variator output gear 232 may be disposed axially between the first planetary gear set 218 and the sixth gear 198 with respect to the variator axis 136.

Moreover, the planetary gear set group 138 of the variator 132 may include a second planetary gear set 234 (a high planetary gear set) with a second sun gear 236, a second ring gear 238, and a plurality of second planet gears 240 with an associated second carrier 242. The second sun gear 236 may be fixed to the fourth hollow shaft 216 for rotation about the variator axis 136. The second planet gears 240 may be enmeshed with and disposed between the second sun gear 236 and the second ring gear 238. The second planet gears 240 and the second carrier 242 may be configured to rotate together about the variator axis 136. The second carrier 242 may also be attached to the first ring gear 222. Likewise, the second ring gear 238 may be centered on and supported for rotation about the variator axis 136. In some embodiments, a first end of the second carrier 242 may be fixed to the variator shaft 134, and the second end of the second carrier 242 may be fixed to the first ring gear 222.

The variator 132 (and planetary gear set group 138) may also include a second output member 244. The second output member 244 may include a relatively short, hollow shaft (or sixth shaft) 246 that receives the variator shaft 134 and has one end fixed to the second ring gear 238 for rotation therewith about the variator axis 136. An eleventh gear (or second variator output gear) 248 may also be fixed on the shaft 246 of second output member 244. In some embodiments, the second variator output gear 248 may be disposed axially to one side of the second planetary gear set 234 and the forward clutch 182 with respect to the variator axis 136, e.g., in the example of FIG. 2, on the left side of the second planetary gear set 234 and the forward clutch 182. Thus, in some embodiments, the second variator output gear 248 and the first variator output gear 232 may be disposed on opposite sides of the variator 132.

It is noted that the creeper clutch 170, the reverse clutch 176, and the forward clutch 182 may be disposed on an input side of the variator 132, which in this example, is the second variator side 168 of the transmission assembly 110. Thus, during operation of the powertrain 102, power (from the engine 104 and/or the CVP 114) may be input to the variator 132 via one or more of these clutches 170, 176, 182, and the variator 132 may output power via the components of the countershaft arrangement 140 and the output arrangement 146 that are described below.

The countershaft arrangement 140 and the output arrangement 146 are positioned within the transmission assembly 110 to appropriately deliver the power from the variator 132 to the output shaft 122. The countershaft arrangement 140 and the output arrangement 146 collectively include a number of additional gears 250, 260, 270, 272, 282, 292, clutches 254, 262, 276, 286, 294, and shafts 252, 268, 274, 284 arranged relative the countershaft 142 and output shaft 122 to perform these functions.

For example, the transmission assembly 110 may include a twelfth gear 250 supported for rotation about the countershaft axis 144. In particular, the twelfth gear 250 may be fixed on an end of a seventh hollow shaft 252, which is centered on the countershaft axis 144. The transmission assembly 110 may further include a fourth clutch 254, which may be referred to as a "first range clutch" in some embodiments. Like the above-described clutches, the fourth clutch 254 may include at least one first member 256 and at least one second member 258. The first member 256 may be fixed to the seventh hollow shaft 252 for rotation about the countershaft axis 144. The second member 258 may be fixed to the countershaft 142. The countershaft 142 may be received within the seventh hollow shaft 252. As such, the fourth clutch 254 may have an engaged position to allow power transmission from the seventh hollow shaft 252 to the countershaft 142 via clutch members 256, 258. The first and second clutch members 256, 258 may alternatively disengage in a disengaged position of the fourth clutch 254 to cut off this power transmission path.

The transmission assembly 110 may further include a thirteenth gear 260. The thirteenth gear 260 may be referred to as a "drive gear" in some embodiments. The drive gear 260 may be fixed to the countershaft 142 for rotation therewith about the countershaft axis 144.

Additionally, the transmission assembly 110 may include a fifth clutch 262, which be referred to as a "second range clutch" in some embodiments. Like the above-described clutches, the fifth clutch 262 may include at least one first member 264 and at least one second member 266. The first member 264 may be fixed to the countershaft 142 for rotation about the countershaft axis 144. The second member 266 may be fixed to an end of an eighth hollow shaft 268. The second member 266 and the eighth hollow shaft 268 may be supported for rotation about the countershaft axis 144. As such, the fifth clutch 262 may have an engaged position to allow power transmission from the eighth hollow shaft 268 to the countershaft 142 via clutch members 264, 266. The first and second clutch members 264, 266 may alternatively disengage in a disengaged position of the fifth clutch 262 to cut off this power transmission path.

The transmission assembly 110 may further include a fourteenth gear 270. The fourteenth gear 270 may be fixed to the eighth hollow shaft 268 on an end that is opposite that of the fifth clutch 262. The fourteenth gear 270 may be enmeshed with the second variator output gear 248 of the second output member 244 of the variator 132.

Additionally, the transmission assembly 110 may include a fifteenth gear 272. The fifteenth gear 272 may be enmeshed with the twelfth gear 250 and may be fixed to one end of a ninth hollow shaft 274. The ninth hollow shaft 274 may receive the output shaft 122 and is centered with a fifteenth gear 272 on the output axis 148 for rotation about the output axis 148.

The transmission assembly 110 may include a sixth clutch 276, which may be referred to as a "third range clutch" in some embodiments. Like the above-described clutches, the sixth clutch 276 may include at least one first member 278 and at least one second member 280. The first member 278 may be fixed to the ninth hollow shaft 274 for rotation about the output axis 148. The second member 280 may be fixed to output shaft 122. The sixth clutch 276 may have an engaged position to allow power transmission from the ninth hollow shaft 274 to the output shaft 122 via clutch members 278, 280. The first and second clutch members 278, 280 may alternatively disengage in a disengaged position of the sixth clutch 276 to cut off this power transmission path.

The transmission assembly 110 may further include a sixteenth gear 282. The sixteenth gear 282 may be enmeshed with the fourteenth gear 270. The sixteenth gear 282 may also be fixed to a tenth hollow shaft 284, which may be centered on to receive, and supported for rotation about, the output axis 148.

Additionally, the transmission assembly 110 may include a seventh clutch 286, which may be referred to as a "fourth range clutch" in some embodiments. Like the above-described clutches, the seventh clutch 286 may include at least one first member 288 and at least one second member 290. The first member 288 may be fixed to the tenth hollow shaft 284 for rotation about the output axis 148. The second member 288 may be fixed to the output shaft 122. The seventh clutch 286 may have an engaged position to allow power transmission from the tenth hollow shaft 284 to the output shaft 122 via clutch members 288, 290. The first and second clutch members 288, 290 may alternatively disengage in a disengaged position of the seventh clutch 286 to cut off this power transmission path.

Furthermore, the transmission assembly 110 may include a seventeenth gear 292. The seventeenth gear 292 may be enmeshed with the drive gear 260. The seventeenth gear 292 may also be operatively attached to an eighth clutch 294. Like the above-described clutches, the eighth clutch 294 may include at least one first member 296 and at least one second member 298. The first member 296 may be fixed to the output shaft 122. The second member 298 may be fixed to the seventeenth gear 292 via a hollow shaft or otherwise to receive the output shaft 122 and may be supported for rotation about the output axis 148. The eighth clutch 294 may have an engaged position to allow power transmission from the seventeenth gear 292 to the output shaft 122 via clutch members 296, 298. The first and second clutch members 296, 298 may alternatively disengage in a disengaged position of the eighth clutch 294 to cut off this power transmission path.

In one embodiment, a parking brake 300 is attached to one end of the output shaft 122 to selectively inhibit or prevent rotation of the output shaft 122.

In some embodiments, the transmission assembly 110 may provide selection between at least two modes chosen from the following group: 1) an all-CVP creeper mode (including powered-zero); 2) a lower speed split-path field mode; and 3) a higher speed split-path field mode. Each of these may be forward modes for drivingly rotating the output shaft 122 in a forward direction (i.e., for moving the work vehicle 100 forward). The transmission assembly 110 may also provide one or more reverse modes for drivingly rotating the output shaft 122 in a reverse (opposite direction) (i.e., for moving the work vehicle 100 in reverse).

Several example modes will be discussed in relation to the embodiment of FIG. 2. For purposes of brevity, only the first through eighth clutches 170, 176, 182, 254, 262, 286, 294 will be discussed for providing these modes. However, it will be appreciated that the other clutches may be provided and engaged and disengaged as needed. Also, power transmission in these modes will be discussed for delivering power to the output shaft 122.

Specifically, as represented in the illustrated embodiment, the transmission assembly 110 may provide the all-CVP creeper mode (i.e., series mode) when the first (creeper), fourth, and eighth clutches 170, 254, 294 are engaged and the second (reverse), third (forward), fifth, sixth, and seventh clutches 176, 182, 262, 276, 286 are disengaged. Accordingly, engine power from the engine 104 may be transmitted from the input shaft 128 to the third gear 192, to the first gear 188, and to the first CVM 116 via the first CVM shaft 154. The first CVM 116 may convert this mechanical input to electrical output for powering the second CVM 118. Meanwhile, the second CVM 118 may drive the second CVM shaft 156 and power may transmit from the second gear 190, to the fourth gear 194, over the first member 172 of the creeper clutch 170, to the sixth gear 198, to the fourth hollow shaft 216, and to the first sun gear 220. In addition, CVM power at the creeper clutch 170 may simultaneously transfer to the first hollow shaft 206, to the fifth gear 196, through the idler gear 200 to the eighth gear 202, across the first member 184 of the forward clutch 182, to the variator shaft 134, through the second carrier 242, to the first ring gear 222. Accordingly, CVM power from the second CVM 118 may re-combine at the first planetary gear set 218 to drive the first output member 228. The first output member 228 may output this power through the twelfth gear 250, to the seventh hollow shaft 252, through the fourth clutch 254, to the countershaft 142, to the drive gear 260, to the seventeenth gear 292, through the eighth clutch 294, to the output shaft 122. Thus, this mode of the transmission assembly 110 provides power from the CVP 114 to the output shaft 122 and also disconnects the engine 104 from the output shaft 122 (i.e., eliminates the direct mechanical connection of the engine 104 such that the engine 104 is merely powering the generator of the first CVM 116). As such, in the creeper mode, the CVP power input is provided into the variator 132 at the first and second input members 212, 214 (i.e., each of which is on the second variator side 168) through the first ring gear 222 and at the first sun gear 220; and the power output is transferred out of the variator 132 through the first output member 228 via the first carrier 226 of the low planetary gear set 218.

The transmission assembly 110 may provide a first split-path forward mode (F2) when the third (forward), fourth, and eighth clutches 182, 254, 294 are engaged and the first (creeper), second (reverse), fifth, sixth, and seventh clutches 170, 176, 262, 276, 286 are disengaged. In this mode, engine power from the input shaft 128 may transfer across the first member 178 of the reverse clutch 176 to the third gear 192, to the ninth gear 204, to the third hollow shaft 210, through the forward clutch 182 to the variator shaft 134, to the second carrier 242, to drivingly rotate the first ring gear 222. Engine power may also drive the gear 192 to transfer power to the first gear 188, to the first CVM shaft 154 to drive the first CVM 116. Electrical power may be generated for powering the second CVM 118. Mechanical power from the second CVM 118 via the second CVM shaft 156 may drive the second gear 190, and this power may transmit to the fourth gear 194 across the first member 172 of the creeper clutch 170, through the sixth gear 198 and the fifth hollow shaft 230 to drive the first sun gear 220. The variator 132 may sum or combine the engine power (e.g., at the first ring gear 222) and the CVP power (e.g., at the first sun gear 220) and output the combined power via the first planet gears 224 and associated carrier 226 to drivingly rotate the first output member 228. The first output member 228 may transfer this power through the first variator output gear 232 to the twelfth gear 250, through the fourth clutch 254, to the countershaft 142, to the drive gear 260, to the seventeenth gear 292, through the eighth clutch 294, to the output shaft 122. In some embodiments, the speed of the engine 104 may remain constant and the output speed of the second CVM 118 may vary in this mode. As such, in the first split-path forward mode (F2), the engine power input is provided into the variator 132 at the second input member 213 through the first ring gear 222 and CVP power input is provided into the variator 132 at the first input member 212 through the first sun gear 220; and the power output is transferred out of the variator 132 through the first output member 228 via the first carrier 226 of the low planetary gear set 218.

The transmission assembly 110 may additionally provide a second split-path forward mode (F3) when the third (forward), fifth, and eighth clutches 182, 262, 294 are engaged and the first (creeper), second (reverse), fourth, sixth, and seventh clutches 170, 176, 254, 276, 286 are disengaged. In this mode, engine power from the input shaft 128 may transfer across the first member 178 of the reverse clutch 176 to the third gear 192, to the ninth gear 204, to the third hollow shaft 210, through the forward clutch 182, to the variator shaft 134, to the second carrier 242, to drivingly rotate the second planet gears 240. Engine power through gear 192 may also drive the gear 188, to the first CVM shaft 154 to drive the first CVM 116. Electrical power may be generated for powering the second CVM 118. Mechanical power from the second CVM 118 via the second CVM shaft 156 may drive the second gear 190, and this power may transmit to the fourth gear 194 on the first member 172 of the creeper clutch 170, through the sixth gear 198 and the fourth hollow shaft 216 to drive the second sun gear 236. The variator 132 may sum or combine the engine power (e.g., at the second planet gears 240) and the CVP power (e.g., at the second sun gear 236) and output combined power via the second ring gear 238 to drivingly rotate the second output member 244. The second output member 244 may transfer this power through the second variator output gear 248 to the fourteenth gear 270, through the fifth clutch 262, to the countershaft 142, to the drive gear 260, to the seventeenth gear 292, through the eighth clutch 294, to the output shaft 122. In some embodiments, the speed of the engine 104 may remain constant and the output speed of the second CVM 118 may vary in this mode. As such, in the second split-path forward mode (F3), the engine power input is provided into the variator 132 at the second input member 213 through the second carrier 242 and CVP power input is provided into the variator 132 at the first input member 212 through the second sun gear 236; and the power output is transferred out of the variator 132 through the second output member 244 via the second ring gear 238 of the high planetary gear set 234.

Furthermore, the transmission assembly 110 may provide a third split-path forward mode (F4) when the third (forward) and sixth clutches 182, 276 are engaged and the first (creeper), second (reverse), fourth, fifth, seventh, and eighth clutches 170, 176, 254, 262, 286, 294 are disengaged. In some examples, the fifth clutch 262 may also be engaged in this mode to maintain the speeds of unloaded components in a controlled state. This mode may be similar to the first split-path forward mode discussed above, including the power flow path into and through the variator 132. However, power at the first output member 228 of the variator 132 may transfer to the gear 232, to the twelfth gear 250, to the seventh hollow shaft 252, through the sixth clutch 276, to the output shaft 122. As such, in the third split-path forward mode (F4), the engine power input is provided into the variator 132 at the second input member 213 through the first ring gear 222 and CVP power input is provided into the variator 132 at the first input member 212 through the first sun gear 220; and the power output is transferred out of the variator 132 through the first output member 228 via the first carrier 226 of the low planetary gear set 218.

Moreover, the transmission assembly 110 may provide a fourth split-path forward mode (F5) when the third (forward) and seventh clutches 182, 286 are engaged and the first (creeper), second (reverse), fourth, fifth, sixth, and eighth clutches 170, 176, 254, 262, 276, 294 are disengaged.

In some examples, the fifth clutch 262 may also be engaged in this mode to maintain the speeds of unloaded components in a controlled state. This mode may be similar to the second split-path forward mode discussed above, including the same power flow path into and through the variator 132. However, power at the second output member 244 of the variator 132 may transfer to the second variator output gear 248, to the fourteenth gear 270, to the sixteenth gear 282, to the tenth hollow shaft 284, through the seventh clutch 286, to the output shaft 122. As such, in the third split-path forward mode (F5), the engine power input is provided into the variator 132 at the second input member 214 through the second carrier 242 and CVP power input is provided into the variator 132 at the first input member 212 through the second sun gear 236; and the power output is transferred out of the variator 132 through the second output member 244 via the second ring gear 238 of the high planetary gear set 234.

Additionally, the transmission assembly 110 may provide a plurality of reverse modes. In some embodiments, there may be a corresponding number of forward and reverse split-path modes. The reverse modes similar to the forward modes discussed above, except that the second clutch (reverse) is engaged instead of the third (forward) clutch 182 in each. For example, a first split-path reverse mode (R2) may be provided when the second (reverse), fourth, and eighth clutches 176, 254, 294 are engaged and the first (creeper), third (forward), fifth, sixth, and seventh clutches 170, 182, 262, 276, 286 are disengaged. Accordingly, engine power from the input shaft 128 may transfer through the reverse clutch 176, to first hollow shaft 206, to the fifth gear 196, to the idler gear 200, to the eighth gear 202, to the variator shaft 134, to the second carrier 242, to drivingly rotate the first ring gear 222. Engine power may also drive the third gear 192, and power may transfer to the first gear 188, to the first CVM shaft 154 to drive the first CVM 116. Electrical power may be generated for powering the second CVM 118. Mechanical power from the second CVM 118 through second CVM shaft 156 to drive the second gear 190, and this power may transmit to the fourth gear 194, through the sixth gear 198 and the fourth hollow shaft 216 to drive the first sun gear 220. As discussed above, the variator 132 may output combined power via the first planet gears 224 and associated first carrier 226 to drivingly rotate the first output member 228. The first output member 228 may transfer this power through the first variator output gear 232 to the twelfth gear 250, through the fourth clutch 254, to the countershaft 142, to the drive gear 260, to the seventeenth gear 292, through the eighth clutch 294, to the output shaft 122. The other reverse modes may be provided in a similar fashion. In the second split-path reverse mode (R3), the reverse clutch 176, the fifth clutch 262, and the drive clutch 294 are engaged; and the creeper clutch 170, the forward clutch 182, the fourth clutch 254, sixth clutch 276, and the seventh clutch 286 are disengaged. In the third split-path reverse mode (R4), the reverse clutch 176 and the sixth clutch 276 engaged; and the creeper clutch 170, the forward clutch 182, the fourth clutch 254, fifth clutch 262, and the seventh clutch 286 are disengaged. In some examples, the fifth clutch 262 may optionally be engaged. A fourth split-path reverse mode may be provided or omitted.

Accordingly, in the first split-path reverse mode (R2), the engine power input is provided into the variator 132 at the second input member 214 through the first ring gear 222 and CVP power input is provided into the variator 132 at the first input member 212 through the first sun gear 220, and the power output is transferred out of the variator 132 through the first output member 228 via the first carrier 226 of the low planetary gear set 218. In the second split-path reverse mode (R3), the engine power input is provided into the variator 132 at the second input member 214 through the second carrier 242 and CVP power input is provided into the variator 132 at the first input member 212 through the second sun gear 236, and the power output is transferred out of the variator 132 through the second output member 244 via the second ring gear 238 of the high planetary gear set 234. In the third split-path reverse mode (R4), the engine power input is provided into the variator 132 at the second input member 213 through the first ring gear 222 and CVP power input is provided into the variator 132 at the first input member 212 through the first sun gear 220, and the power output is transferred out of the variator 132 through the first output member 228 via the first carrier 226 of the low planetary gear set 218.

It will be appreciated that, in one or more of these modes, the powertrain 102 may provide power to the PTO shaft element 124 as well, e.g., through the input shaft 128.

Figure 3:
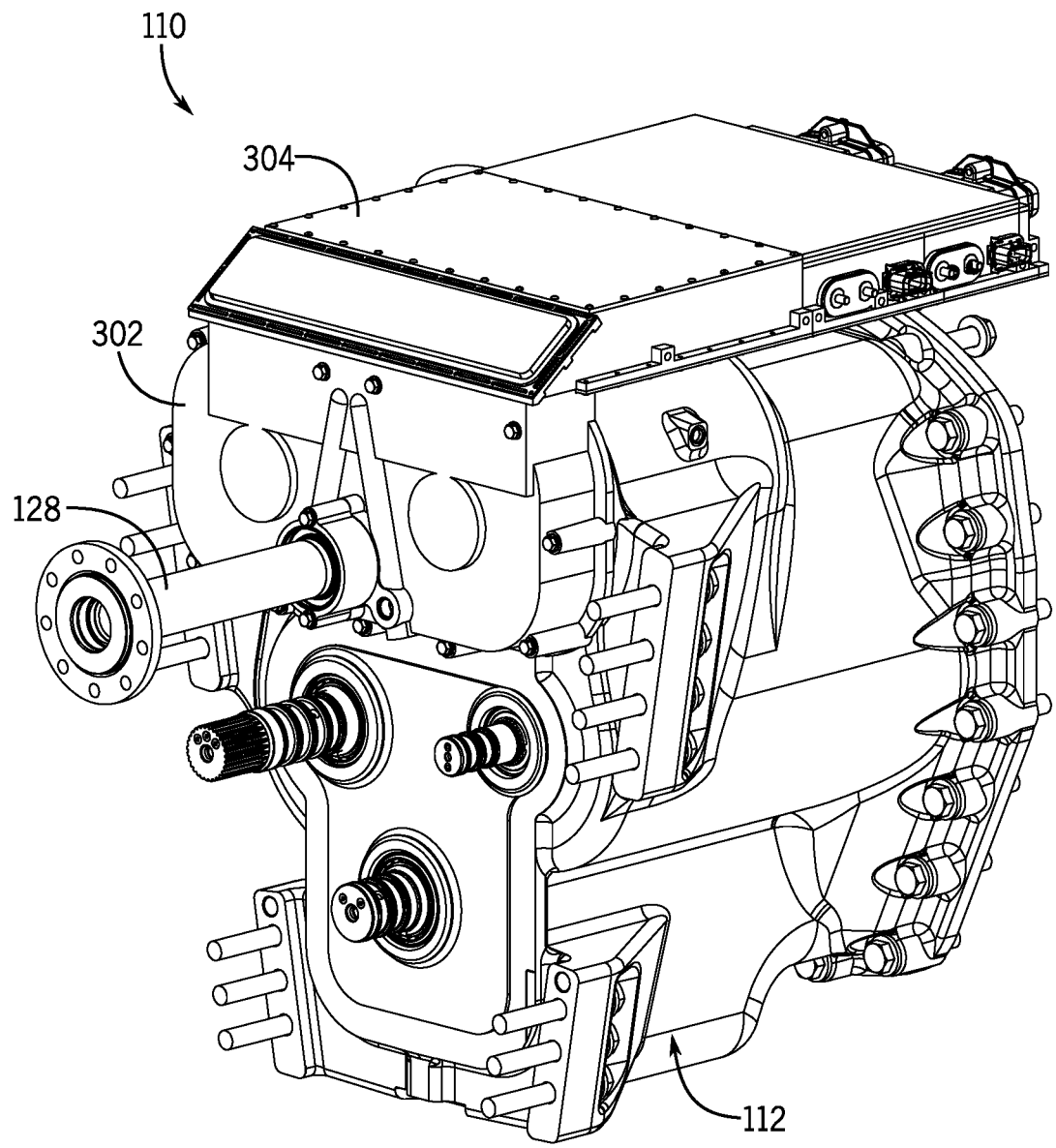
FIG. 3 is an external isometric view of the transmission assembly of FIG. 2 according to an example embodiment of the present disclosure.
Figure 4:
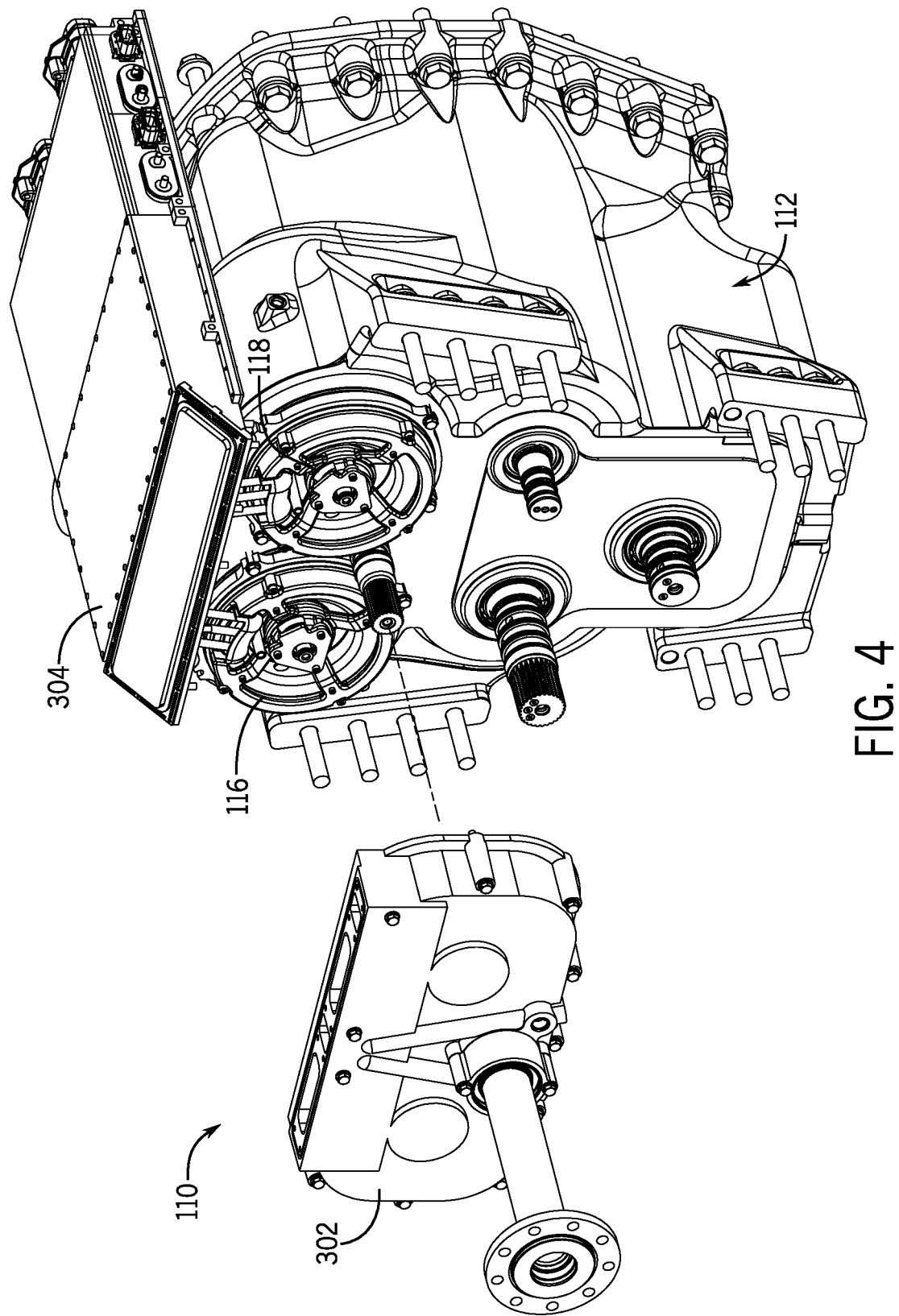
FIGS. 4-6 are isometric view of the transmission assembly of FIG. 3 with portions of a housing removed according to an example embodiment of the present disclosure.

One example implementation of the transmission assembly 110 is represented in the views of FIGS. 3-7, which depicts a number of the components described above. In particular, FIG. 3 provides an external isometric view of the transmission assembly 110 that depicts the transmission assembly housing 112, as well as the input shaft 128 extending into the transmission assembly 110. The views of FIGS. 4-7 depict the transmission assembly 110 with various portions of the housing 112 removed. As shown, and referring to FIGS. 3-7, the first and second CVMs 116, 118 may be considered "cartridge-style" machines that may be inserted into the housing 112. The first and second CVMs 116, 118 are arranged "over" (or to axially overlap) the variator 132 within the housing 112. In particular, portions of the CVMs 116, 118 the variator 132 intersect a first imaginary plane 137 (e.g., a vertical plane) that is orthogonal to the variator shaft 134. In some examples, the CVMs 116, 118 and CVM shafts 154, 154 are parallel to one another and further may be in a common second imaginary plane (e.g., a horizontal plane) that is perpendicular to the first imaginary plane.

Figure 5:
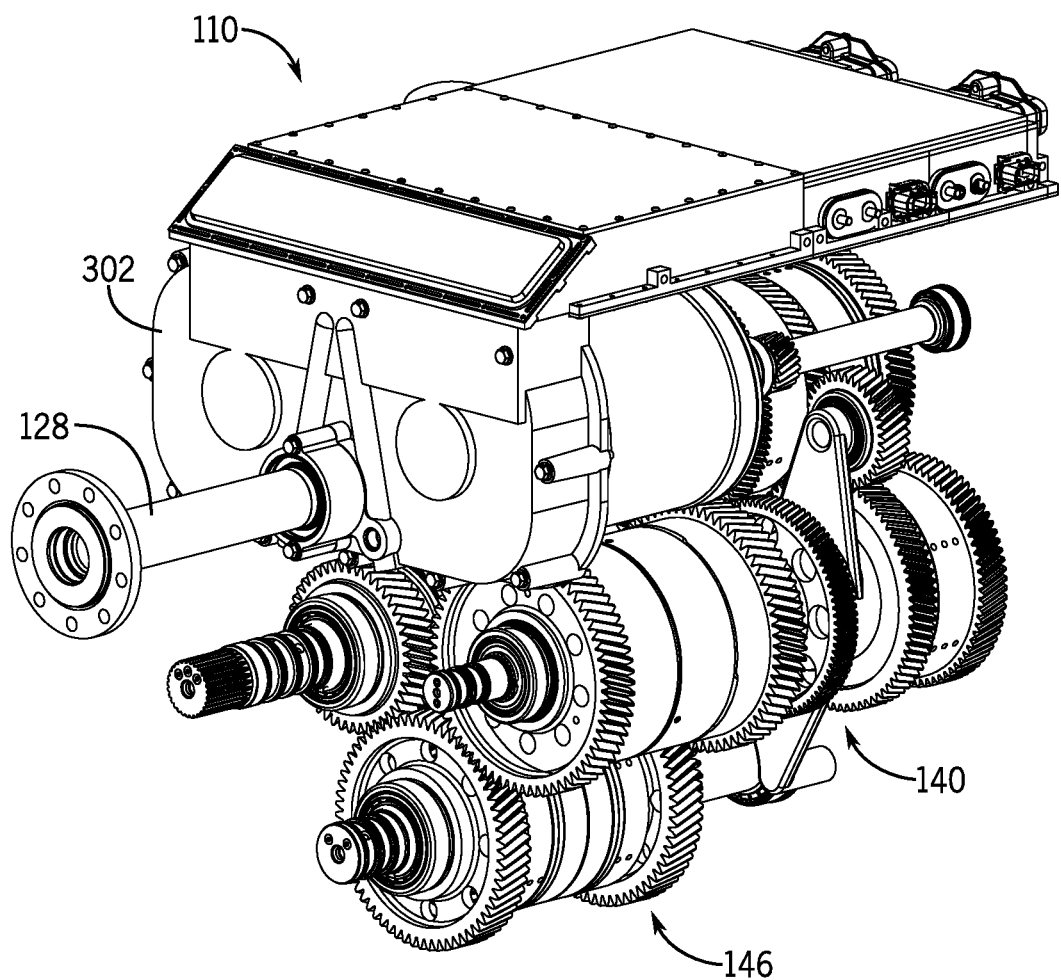
Figure 6:
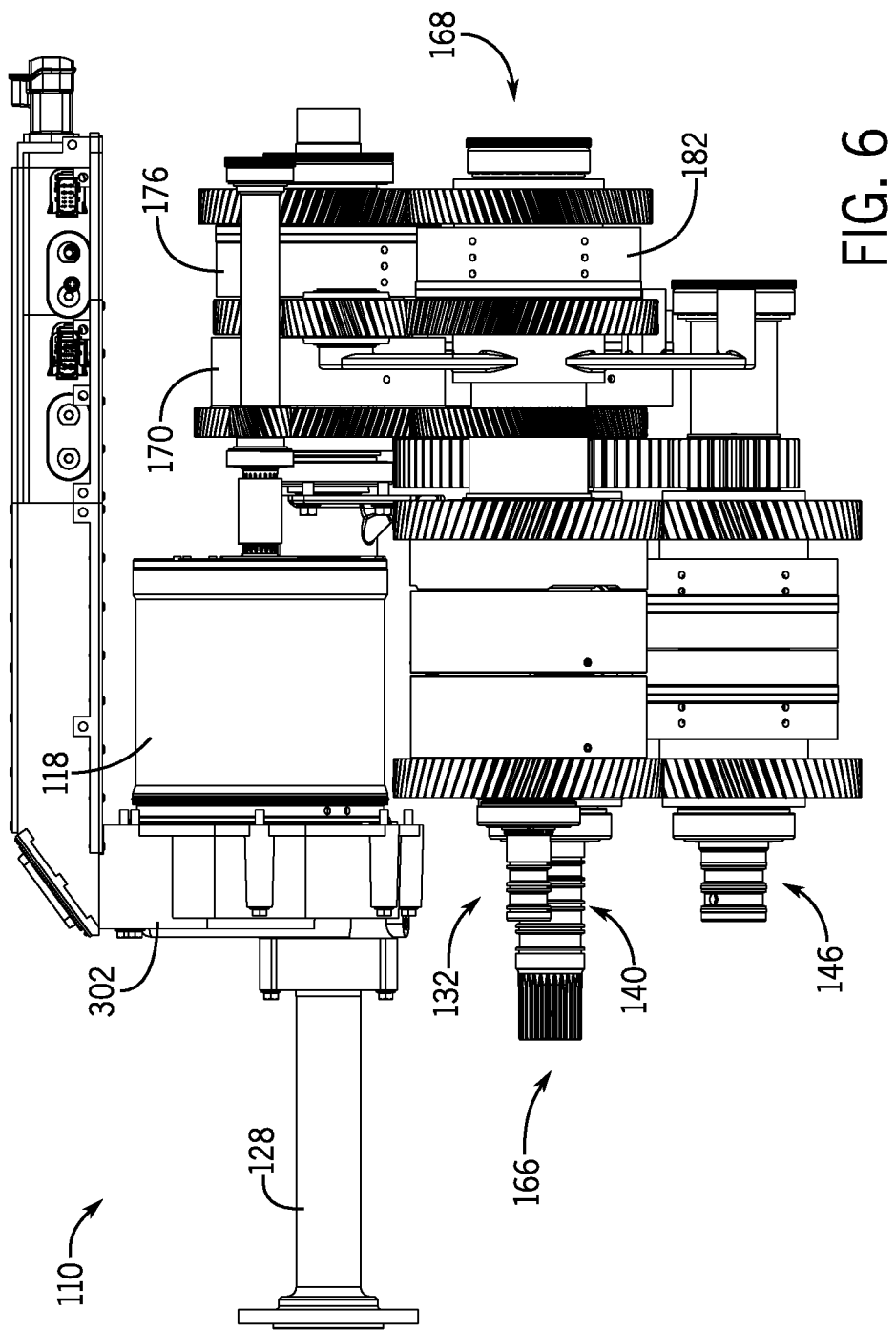

In this arrangement, the CVMs 116, 118 may have relatively thin or omitted machine housings since the CVMs 116, 118 are housed within the transmission assembly housing 112. In some examples, a portion of the transmission assembly housing 112 may include machine caps 302. The machine caps 302 may be removable relative to the other portions of the transmission assembly housing 112 to enable access to the CVMs 116, 118 (e.g., the stators of electric machine-type CVMs). In the views of FIGS. 3, 5, and 6, the machine caps 302 are depicted as maintained on the transmission assembly housing 112; and in the views of FIGS. 4 and 7, the machine caps 302 have been removed to depict the access to internal components of the CVMs 116, 118. As shown, the entire length of the CVMs 116, 118 may be considered to be housed within the transmission assembly housing 112. In other examples, substantially all of the CVMs 116, 118 (e.g., more than 75% or more than 90% of the length) may be housed within the transmission assembly housing 112.

Figure 7:
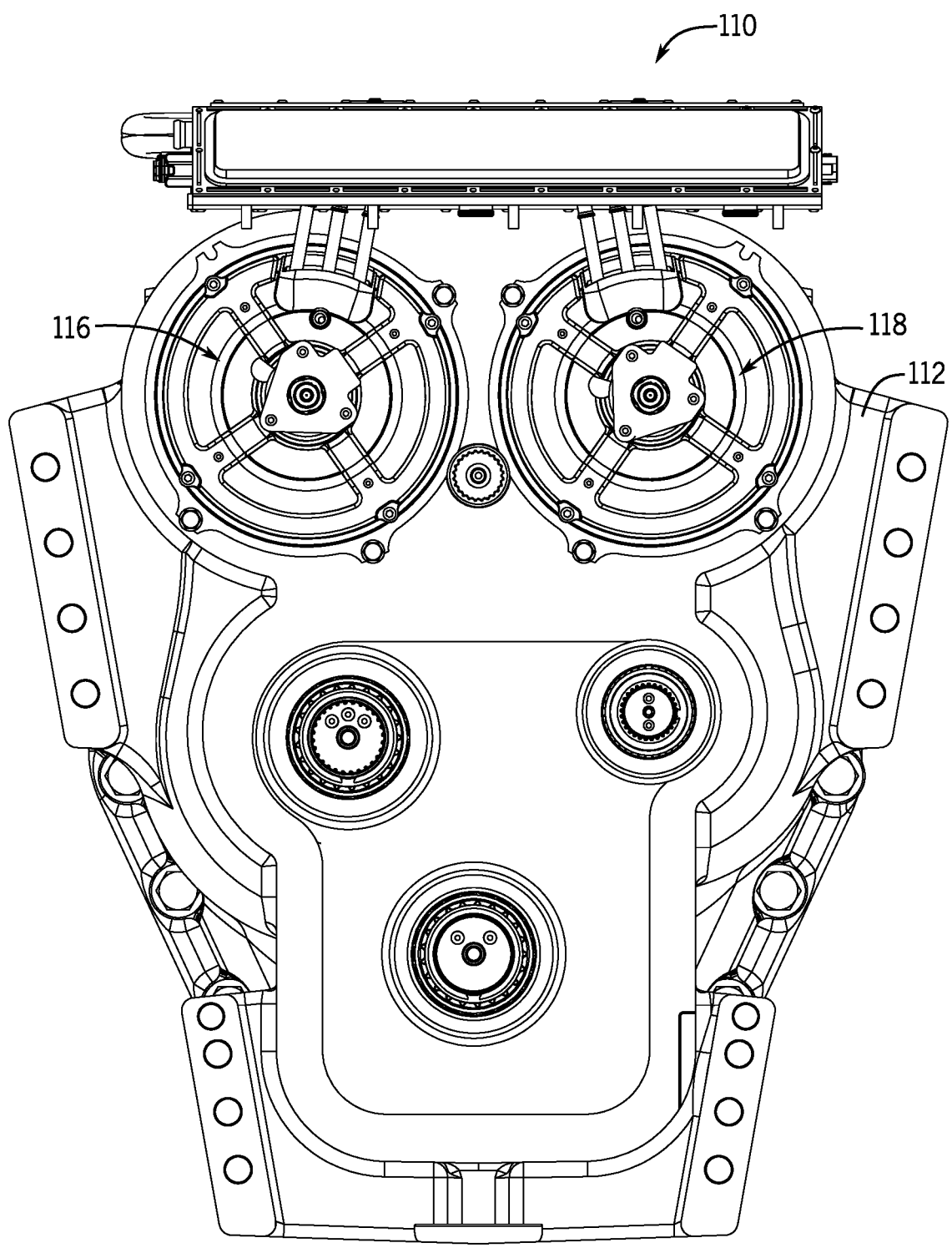
FIG. 7 is an end view of the transmission assembly of FIG. 3 with portions of the housing removed according to an example embodiment of the present disclosure.

As also shown in FIGS. 3-7, one or more additionally and/or auxiliary components 304 may be provided on the transmission assembly housing 112. The auxiliary component 304 may be cooling elements and/or power electronic elements (e.g., an inverter). As best shown in FIG. 7, the auxiliary component 304 may be arranged on the transmission assembly housing 112 in a position for connection to the CVMs 116, 118.

The view of the transmission assembly 110 of FIG. 6 also clearly depicts the power input from the CVMs 116, 118 and input shaft 128 at the second variator side 168 as opposed to the first variator side 166. As such, the both of the power inputs are at a common side of the variator 132.

According to the embodiments described herein, an example method may also provide the ability to more readily manufacture and/or assembly the transmission assembly 110. In particular, the transmission assembly 110 may be assembled within the transmission assembly housing 112, including the input arrangement 126, the variator 132, the countershaft arrangement 140, and the output arrangement 146, as described above. The CVMs 116, 118 may be inserted through the transmission assembly housing 112 and secured within the transmission assembly housing 112 for coupling to the input arrangement 126, as also described above. For example, the described embodiments enable an assembly in which the gears and shafts are assembled from a first side of the housing 112 (e.g., from the direction of the second variator side 168) and the housing 112 is rotated to insert the CVMs 116, 118 on the other side (e.g., from the direction of the first variator side 168 such that the CVM shafts 154, 156 interact with power transfer components proximate to the second variator side 166).

Accordingly, the powertrain described herein provides a transmission assembly coupled to an engine and integrated with a CVP to operate in a plurality of modes to power an output arrangement with CVP power or engine power. The operator may select between these different modes and/or the transmission assembly may automatically shift between these modes to maintain high operating efficiency in a number of different operating conditions.

Also, the transmission assembly may be constructed and arranged in a well-organized and compact manner that enables integration of the CVP within a common housing of the transmission assembly. As such, the packaging and overall dimensions of the transmission assembly and CVP may be smaller than comparable arrangements, while maintaining the ability to provide multiple forward and reverse modes.

In some examples, the transmission assembly enables use of cartridge-style CVMs as discussed herein to provide an assembly that does not require a bolt flange between the CVM and transmission assembly housing, thereby eliminating g-load vibration on the bolt flange and reduced tolerances. The powertrain further provides the ability to support the CVMs at only the front and rear within the common housing or by completely surrounding the CVMs with the common housing, as desired, as well as additional flexibility for cooling the CVMs and transmission components. For example, in conventional arrangements, lubrication and/or cooling fluid may only drain from the front face or the bottom of the respective CVM, thereby requiring external plumbing to drain the oil back to the transmission; and in CVMs of the example transmission assembly described above, the lubrication and/or cooling fluid may be injected or drained back to the transmission anywhere along the length without requiring external plumbing since the CVMs are housed within a common transmission housing. The CVMs of the example transmission assembly enable cooling fluid either in between the respective CVM housing and stator; between the CVM housing and the transmission assembly housing; or both. In one example, the cooling fluid between the CVM housing and transmission assembly housing may be other coolants rather than oil (water-ethylene glycol, etc.). In some examples, the CVMs of the example transmission assembly may be held in place with fewer fasteners than an externally mounted CVM and the placement of such fasteners may be more accessible. Further, CVMs of the example transmission assembly enable the electrical power to connect directly to the inverter and/or other electronic components rather than requiring a connection box and cables.

Also, the following examples are provided, which are numbered for easier reference.

1. A transmission assembly for a work vehicle powertrain having an engine delivering engine power to an input shaft, the transmission assembly comprising: a transmission assembly housing having a first housing side through which the input shaft extends and a second housing side opposite the first housing side; a continuously variable power source (CVP) at least partially contained within the transmission assembly housing; an input arrangement contained within the transmission assembly housing and having at least one input transmission component selectively coupling engine power from the input shaft and CVP power from the CVP; a variator contained within the transmission housing with a first variator side oriented toward the first housing side of the transmission assembly housing and a second variator side oriented toward the second housing side of the transmission assembly housing and configured to receive engine power through the input arrangement on the second variator side and to receive CVP power through the input arrangement on the second variator side; and a transmission gear arrangement contained within the transmission assembly housing and configured to provide a selective gear reduction for transmission of output power from the variator to an output shaft.

2. The transmission assembly of example 1, wherein the transmission assembly is configured to provide selection between a plurality of transmission modes in which the transmission assembly transmits power from at least one of the engine and the CVP to the output shaft, wherein the input arrangement defines an input axis extending along the input shaft and having at least one input transmission component that is supported for rotation about the input axis, the input shaft configured to input the engine power for rotating the at least one input transmission component and the CVP connected to the input arrangement and configured to input the CVP power thereto for rotating the at least one input transmission component, and wherein the variator defines a variator axis and includes: at least one planetary gear set group at least partially supported for selective rotation about the variator axis and arranged to have a first gear set side and a second gear set side, and a variator shaft supported for rotation about the variator axis and extending through the at least one planetary gear set, wherein the transmission assembly has at least one of the plurality of transmission modes in which the variator is configured to receive the engine power and the CVP power the second variator side via the input arrangement and to output combined power, and wherein the transmission gear arrangement includes: a countershaft arrangement defining a countershaft axis and including at least one countershaft component that is supported for rotation about the countershaft axis, the countershaft arrangement configured to receive the combined power from the variator for rotating the at least one countershaft component; and an output arrangement defining an output axis and including at least one output component connected to the output shaft, the output arrangement configured to receive the combined power from the countershaft arrangement to drive the output shaft in rotation about the output axis.

3. The transmission assembly of example 2, wherein the CVP overlaps the at least one planetary gear set group relative to an imaginary reference plane that is perpendicular to the variator axis.

4. The transmission assembly of example 2, wherein the variator is configured such that, in each of the plurality of transmission modes, the variator receives the engine power and the CVP power on the second variator side.

5. The transmission assembly of example 2, wherein the CVP includes a first continuously variable machine (CVM) and a second CVM.

6. The transmission assembly of example 5, wherein the transmission assembly housing houses the planetary gear set group and substantially all of the first CVM and the second CVM.

7. The transmission assembly of example 5, wherein all of the first CVM and the second CVM are housed within the transmission assembly housing.

8. The transmission assembly of example 5, wherein the first CVM and the second CVM are cartridge-style CVMs configured to be inserted through the first housing side of the transmission assembly housing for assembly.

9. The transmission assembly of example 5, wherein, in at least one of the plurality of transmission modes, the input arrangement is configured to provide a first portion of the engine power to the first CVM, the first CVM provides electrical power to the second CVM, and the second CVM provides the CVP power.

10. The transmission assembly of example 9, wherein the input arrangement further includes a first clutch and a second clutch supported about the input shaft and a third clutch supported about the variator shaft, wherein the input arrangement further includes a first gear fixed to a first CVM shaft of the first CVM, a second gear fixed to a second CVM shaft of the second CVM, a third gear fixed to the second clutch and enmeshed with the first gear, and a fourth gear fixed to the first clutch and enmeshed with the second gear, and wherein first portion of the engine power to the first CVM is transmitted through the third and first gears to the first CVM and at least a portion of the CVP power is transmitted to the variator through the second and fourth gears.

11. The transmission assembly of example 10, wherein the transmission assembly is configured such that a second portion of the engine power is transferred to the variator shaft across at least one member of the third clutch.

12. The transmission assembly of example 2, wherein the plurality of transmission modes includes a series transmission mode in which: the input arrangement is configured to disconnect the engine from the variator; the variator is configured to receive the CVP power from the CVP; and the variator is configured to output the CVP power.

13. The transmission assembly of example 12, wherein, in the series transmission mode: the engine provides power to the first CVM to generate power that is supplied to the second CVM; the second CVM provides power to a first input member of the variator; the second CVM provides power to a second input member of the variator; and the variator recombines power from the first and second input members that is output to the countershaft arrangement.

14. A method of manufacturing a powertrain for a work vehicle, the method comprising: providing an engine, a continuously variable power source (CVP), and an output shaft; providing a transmission assembly configured to operably connect the engine and the CVP to the output shaft, the transmission assembly configured to provide selection between a plurality of transmission modes in which the transmission assembly transmits power from at least one of the engine and the CVP to the output shaft, the transmission assembly including: an input arrangement defining an input axis and having at least one input transmission component that is supported for rotation about the input axis, the engine connected to the input arrangement and configured to input engine power thereto for rotating the at least one input transmission component, the CVP connected to the input arrangement and configured to input CVP power thereto for rotating the at least one input transmission component; a variator defining a variator axis and including: at least one planetary gear set group at least partially supported for selective rotation about the variator axis and arranged to have a first gear set side and a second gear set side, and a variator shaft supported for rotation about the variator axis and extending through the at least one planetary gear set, the variator shaft having a first variator shaft side proximate to or extending beyond the first gear set side of the at least one planetary gear set group and a second variator shaft side proximate to or extending beyond the second gear set side of the at least one planetary gear set group, wherein the first gear set side and the first variator shaft end define a first variator side, and the second gear set side and the second variator shaft end defining a second variator side; a countershaft arrangement defining a countershaft axis and including at least one countershaft component that is supported for rotation about the countershaft axis, the countershaft arrangement configured to receive the combined power from the variator for rotating the at least one countershaft component; and an output arrangement defining an output axis and including at least one output component connected to the output shaft, the output arrangement configured to receive the combined power from the countershaft arrangement to drive the output shaft in rotation about the output axis; and arranging the transmission assembly and the CVP such that the transmission assembly is configured to operate in at least one of the plurality of transmission modes in which the variator receives the engine power and the CVP power on a common side of the first and second variator sides via the input arrangement and to output combined power.

15. The method of example 14, wherein the arranging step includes arranging the transmission assembly and the CVP such that, in each of the plurality of transmission modes, the variator receives the engine power and the CVP power on the common side of the first and second variator sides.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various other implementations are within the scope of the following claims.

What is claimed is:

1. A transmission assembly for a work vehicle powertrain having an engine delivering engine power to an input shaft, the transmission assembly comprising:
   a transmission assembly housing having a first housing side through which the input shaft extends and a second housing side opposite the first housing side;
   a continuously variable power source (CVP) at least partially contained within the transmission assembly housing, the CVP including a first continuously variable machine (CVM) and a second CVM;
   an input arrangement contained within the transmission assembly housing and having at least one input transmission component selectively coupling engine power from the input shaft and CVP power from the CVP, the input arrangement including a first clutch, a second clutch and a third clutch and a first gear fixed to a first CVM shaft of the first CVM, a second gear fixed to a second CVM shaft of the second CVM, a third gear fixed to the second clutch and enmeshed with the first gear, and a fourth gear fixed to the first clutch and enmeshed with the second gear;
   a variator contained within the transmission assembly housing with a first variator side oriented toward the first housing side of the transmission assembly housing and a second variator side oriented toward the second housing side of the transmission assembly housing and configured to receive engine power through the input arrangement on the second variator side and to receive CVP power through the input arrangement on the second variator side; and
   a transmission gear arrangement contained within the transmission assembly housing and configured to provide a selective gear reduction for transmission of output power from the variator to an output shaft;
   wherein the input arrangement is configured to provide a first portion of the engine power to the first CVM, the first CVM provides electrical power to the second CVM, and the second CVM provides the CVP power,
   wherein the first portion of the engine power to the first CVM is transmitted through the third and first gears to the first CVM and at least a portion of the CVP power is transmitted to the variator through the second and fourth gears,
   wherein the transmission assembly is configured to provide selection between a plurality of transmission modes in which the transmission assembly transmits power from at least one of the engine and the CVP to the output shaft,
   wherein the input arrangement defines an input axis extending along the input shaft and the at least one input transmission component is supported for rotation about the input axis, the input shaft configured to input the engine power for rotating the at least one input transmission component and the CVP connected to the input arrangement and configured to input the CVP power thereto for rotating the at least one input transmission component,
   wherein the variator defines a variator axis and includes:
      a planetary gear set at least partially supported for selective rotation about the variator axis and arranged to have a first gear set side and a second gear set side, and
      a variator shaft supported for rotation about the variator axis and extending through the planetary gear set,
   wherein the transmission assembly has at least one of the plurality of transmission modes in which the variator is configured to receive the engine power and the CVP power on the second variator side via the input arrangement and to output combined power,
   wherein the transmission gear arrangement includes:
      a countershaft arrangement defining a countershaft axis and including at least one countershaft component that is supported for rotation about the countershaft axis, the countershaft arrangement configured to receive the combined power from the variator for rotating the at least one countershaft component; and
      an output arrangement defining an output axis and including at least one output component connected to the output shaft, the output arrangement configured to receive the combined power from the countershaft arrangement to drive the output shaft in rotation about the output axis, and
   wherein the first clutch and the second clutch are supported about the input shaft and the third clutch is supported about the variator shaft.

2. The transmission assembly of claim 1, wherein the CVP overlaps the planetary gear set relative to an imaginary reference plane that is perpendicular to the variator axis.

3. The transmission assembly of claim 1, wherein the variator is configured such that, in each of the plurality of transmission modes, the variator receives the engine power and the CVP power on the second variator side.

4. The transmission assembly of claim 1, wherein the transmission assembly housing houses the planetary gear set and substantially all of the first CVM and the second CVM.

5. The transmission assembly of claim 1, wherein all of the first CVM and the second CVM are housed within the transmission assembly housing.

6. The transmission assembly of claim 1, wherein the first CVM and the second CVM are cartridge-style CVMs configured to be inserted through the first housing side of the transmission assembly housing for assembly.

7. The transmission assembly of claim 1, wherein the transmission assembly is configured such that a second portion of the engine power is transferred to the variator shaft across at least one member of the third clutch.

8. The transmission assembly of claim 1, wherein the plurality of transmission modes includes a series transmission mode in which:
   the input arrangement is configured to disconnect the engine from the variator;
   the variator is configured to receive the CVP power from the CVP; and
   the variator is configured to output the CVP power.

9. The transmission assembly of claim 8,
   wherein, in the series transmission mode:
      the engine provides power to the first CVM to generate power that is supplied to the second CVM;
      the second CVM provides power to a first input member of the variator;
      the second CVM provides power to a second input member of the variator; and
      the variator recombines power from the first and second input members that is output to the countershaft arrangement.

10. A method of manufacturing a powertrain for a work vehicle, the method comprising:
providing an engine, a continuously variable power source (CVP), and an output shaft;
providing a transmission assembly configured to operably connect the engine and the CVP to the output shaft, the transmission assembly configured to provide selection between a plurality of transmission modes in which the transmission assembly transmits power from at least one of the engine and the CVP to the output shaft, the transmission assembly including:
an input arrangement defining an input axis and having at least one input transmission component that is supported for rotation about the input axis, the engine connected to the input arrangement and configured to input engine power thereto for rotating the at least one input transmission component, the CVP connected to the input arrangement and configured to input CVP power thereto for rotating the at least one input transmission component;
a variator defining a variator axis and including:
a planetary gear set at least partially supported for selective rotation about the variator axis and arranged to have a first gear set side and a second gear set side, and
a variator shaft supported for rotation about the variator axis and extending through the planetary gear set, the variator shaft having a first variator shaft side proximate to or extending beyond the first gear set side of the planetary gear set and a second variator shaft side proximate to or extending beyond the second gear set side of the planetary gear set,
wherein the first gear set side and the first variator shaft side define a first variator side, and the second gear set side and the second variator shaft side defining a second variator side;
a countershaft arrangement defining a countershaft axis and including at least one countershaft component that is supported for rotation about the countershaft axis, the countershaft arrangement configured to receive combined power from the variator for rotating the at least one countershaft component; and
an output arrangement defining an output axis and including at least one output component connected to the output shaft, the output arrangement configured to receive the combined power from the countershaft arrangement to drive the output shaft in rotation about the output axis; and
arranging the transmission assembly and the CVP such that the transmission assembly is configured to operate in at least one of the plurality of transmission modes in which the variator receives the engine power and the CVP power on a common side of the first and second variator sides via the input arrangement and to output combined power;
wherein the CVP includes a first continuously variable machine (CVM) and a second CVM,
wherein the arranging step includes arranging the transmission assembly within a transmission assembly housing and arranging the first CVM and the second CVM substantially within the transmission assembly housing,
wherein the providing the transmission assembly step includes providing the transmission assembly such that, in at least one of the plurality of transmission modes, the input arrangement is configured to provide a first portion of the engine power to the first CVM, the first CVM provides electrical power to the second CVM, and the second CVM provides the CVP power; the input arrangement includes an input shaft extending along the input axis, a first clutch and a second clutch supported about the input shaft, and a third clutch supported about the variator shaft; and the input arrangement further includes a first gear fixed to a first CVM shaft of the first CVM, a second gear fixed to a second CVM shaft of the second CVM, a third gear fixed to the second clutch and enmeshed with the first gear, and a fourth gear fixed to the first clutch and enmeshed with the second gear, and
wherein the arranging step includes arranging the transmission assembly and the CVP such that the first portion of the engine power to the first CVM is transmitted through the third and first gears to the first CVM, at least a portion of CVP power is transmitted to the variator through the second and fourth gears, and a second portion of the engine power is transferred to the variator shaft across at least one member of the third clutch.

11. The method of claim 10, wherein the arranging step includes arranging the transmission assembly and the CVP such that, in each of the plurality of transmission modes, the variator receives the engine power and the CVP power on the common side of the first and second variator sides.

12. The method of claim 10, wherein the arranging step includes inserting the first CVM and the second CVM through the transmission assembly housing for connection with the transmission assembly.

13. The method of claim 10, wherein the arranging step includes arranging the CVP to overlap the planetary gear set relative to an imaginary reference plane that is perpendicular to the variator axis.

* * * * *